(12) United States Patent
Xhafa et al.

(10) Patent No.: US 12,257,921 B2
(45) Date of Patent: Mar. 25, 2025

(54) ONE-HOP EXTENSION

(71) Applicant: TEXAS INSTRUMENTS INCORPORATED, Dallas, TX (US)

(72) Inventors: Ariton E. Xhafa, Plano, TX (US); Torbjørn Sørby, Kolsås (NO); Minghua Fu, Plano, TX (US); Jesus Daniel Torres Bardales, Plano, TX (US); Ramanuja Vedantham, Frisco, TX (US); Alexis Justine Burnight, Dallas, TX (US); Archanaa Santhana Krishnan, Worcester, MA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/407,719

(22) Filed: Jan. 9, 2024

(65) Prior Publication Data
US 2024/0140254 A1 May 2, 2024

Related U.S. Application Data

(63) Continuation of application No. 17/233,106, filed on Apr. 16, 2021, now Pat. No. 11,872,905.

(51) Int. Cl.
*B60L 58/10* (2019.01)
*H04L 67/12* (2022.01)

(52) U.S. Cl.
CPC ........... *B60L 58/10* (2019.02); *B60L 2240/42* (2013.01); *H04L 67/12* (2013.01)

(58) Field of Classification Search
CPC ....... B60L 58/10; B60L 2240/42; H04L 67/12
See application file for complete search history.

(56) References Cited

U.S. PATENT DOCUMENTS

| | | | |
|---|---|---|---|
| 6,745,013 B1 | 6/2004 | Porter et al. | |
| 6,879,567 B2 | 4/2005 | Callaway et al. | |
| 8,223,783 B2* | 7/2012 | Shorty | H04L 12/10 370/406 |
| 9,253,786 B2* | 2/2016 | Kazmi | H04W 72/541 |
| 9,293,935 B2* | 3/2016 | Lee | H04Q 9/00 |
| 10,915,386 B2 | 2/2021 | Cho et al. | |
| 11,038,216 B2 | 6/2021 | Kwon | |

(Continued)

OTHER PUBLICATIONS

M. Cao, X. Wang, S.-j. Kim and M. Madihian, "Multi-hop wireless backhaul networks: a cross-layer design paradigm," in IEEE Journal on Selected Areas in Communications, vol. 25, No. 4, pp. 738-748, May 2007, doi: 10.1109/JSAC.2007.070510. (Year: 2007).*

(Continued)

*Primary Examiner* — Gertrude Arthur Jeanglaude
(74) *Attorney, Agent, or Firm* — Carl G. Peterson; Frank D. Cimino

(57) ABSTRACT

A vehicular battery management system (BMS) comprises a battery controller, a set of battery cells, a primary network node coupled to the battery controller, and a secondary network node coupled to the set of battery cells. The primary and secondary network nodes are configured to wirelessly communicate with each other using frames that share a common frame format. The frame format includes one or more bits and a status of the one or more bits indicates whether the secondary network node is to communicate with the primary network node on behalf of another secondary network node.

20 Claims, 11 Drawing Sheets

(56) References Cited

U.S. PATENT DOCUMENTS

| | | | |
|---|---|---|---|
| 11,483,824 | B2 | 10/2022 | Lee |
| 2010/0259221 | A1 | 10/2010 | Tabatowski-Bush |
| 2016/0218866 | A1 | 7/2016 | Patil et al. |
| 2019/0082379 | A1* | 3/2019 | Abouelseoud ........ H04W 16/28 |
| 2019/0273293 | A1 | 9/2019 | Kim et al. |
| 2020/0396688 | A1 | 12/2020 | Hong |
| 2021/0043983 | A1 | 2/2021 | Choi |
| 2021/0084675 | A1 | 3/2021 | Aijaz |
| 2022/0091062 | A1 | 3/2022 | Gullapalli |
| 2022/0113356 | A1 | 4/2022 | Kasselman |
| 2022/0179001 | A1 | 6/2022 | Park |

OTHER PUBLICATIONS

Xhafa, et al., U.S. Appl. No. 17/820,441, "Mesh Network During Keep Alive in Wireless Battery Management System", filed Aug. 17, 2022.

Kunduru, et al., U.S. Appl. No. 17/823,138, "Multiple Primary Nodes for Wireless Battery Management System Robustness", filed Aug. 30, 2022.

International Standard, ISO 26262-1, "Road vehicles—Functional Safety", International Organization for Standardization, Second Addition, Dec. 2018, 42 pgs.

Xhafa, et al., "Wireless Protocol for Battery Management Systems", Texas Instruments, Jun. 4, 2019, 6 pgs.

Texas Instruments. CC2642R SimpleLink(TM) Bluetooth(R) 5.2 Low Energy Wireless MCU. SWRS194H—Jan. 2018—Revised Mar. 2021. 66 pages.

Xhafa, et al., "Enabling Data Integrity in Wireless Devices Connected to Battery Monitor", Texas Instruments, Jun. 4, 2019, 4 pgs.

EM Microelectronic, EM9301 Datasheet, 2018, 51 pages (Year: 2018).

Song et al. "The AES-CMAC Algorithm", National Institute of Standards and Technology (NIST), 2006, "https://www.rfc-editor.org/ rfc/pdfrfc/rfc4493.txt.pdf", 20 pages (Year: 2006).

Nordic semiconductor, nRF25840 Datasheet, 2018, 551 pages (Year: 2018).

\* cited by examiner

ONE-HOP EXTENSION

This application is a continuation of U.S. patent application Ser. No. 17/233,106, filed Apr. 16, 2021, currently pending and scheduled to grant as U.S. Pat. No. 11,872,905 on Jan. 16, 2024, which is incorporated by reference herein in its entirety.

BACKGROUND

Modern vehicles may include multiple battery cells. Information associated with the cells, such as temperature, voltage, and other indicators of cell status and health, may be monitored for vehicular safety and to ensure proper operation.

SUMMARY

In accordance with at least one example of the disclosure, A vehicular battery management system (BMS) comprises a battery controller, a set of battery cells, a primary network node coupled to the battery controller, and a secondary network node coupled to the set of battery cells. The primary and secondary network nodes are configured to wirelessly communicate with each other using frames that share a common frame format. The frame format includes one or more bits and a status of the one or more bits indicates whether the secondary network node is to communicate with the primary network node on behalf of another secondary network node.

In accordance with at least one example of the disclosure, a vehicular battery management method comprises a primary network node, a battery controller, a plurality of secondary network nodes, and a set of battery cells. The primary network node is coupled to the battery controller and the plurality of secondary network nodes are coupled to the set of battery cells. The primary network node is used for transmitting a downlink frame comprising a frame format to the secondary network nodes. The frame format includes one or more bits indicating whether one of the plurality of secondary network nodes is to communicate with the primary network node on behalf of another one of the plurality of secondary network nodes.

In accordance with at least one example of the disclosure, a non-transitory computer-readable medium storing executable code, which, when executed by a processor of a primary network node coupled to a battery of a vehicular battery management system (BMS), causes the processor to identify a plurality of secondary network nodes and the secondary network nodes coupled to a set of battery cells. The instructions further cause the processor to perform a security check of the plurality of secondary network nodes to verify security frames in a frame format. Responsive to a successful verification of the security frames, the instructions further cause the processor to transmit a downlink frame comprising the frame format to the plurality of secondary network nodes. The frame format includes one or more bits that indicate whether one of the plurality of secondary network nodes is to communicate with the primary network node on behalf of another one of the plurality of secondary network nodes.

BRIEF DESCRIPTION OF THE DRAWINGS

For a detailed description of various examples, reference will now be made to the accompanying drawings in which.

DETAILED DESCRIPTION

As explained above, information associated with vehicle battery cells, such as temperature, voltage, and other indicators of cell status and health, may be monitored for vehicular safety and to ensure proper operation. This information is frequently communicated to a battery controller, which may take any of a variety of actions, depending on the information received. The cells and the battery controller communicate with each other via a wired system that includes a primary node (also understood as a master node) coupled to the controller, secondary nodes (also understood as slave nodes) coupled to the cells, and wired connections between the primary and secondary nodes. To comply with modern safety standards, communications between the primary and secondary nodes occurs using standards from the International Organization of Standards (ISO) (e.g., the ISO serial peripheral interface (SPI) protocol (isoSPI protocol)). The wired communication system, however, is disadvantageous at least because the wires increase vehicle weight and related inefficiencies (e.g., fuel efficiency), and because the wires prevent the replacement of individual battery cells if the cells are damaged or defective.

This disclosure describes various examples of a wireless BMS in which the network nodes for battery controllers and cells communicate wirelessly with each other. The BMS includes a secondary node that collects information (e.g., sensed properties such as voltage and temperature) from multiple cells and wirelessly transmits the information to a primary node that couples to a BMS controller. The primary node provides the received information to the BMS controller. In turn, the BMS controller may take suitable actions responsive to the received information, such as forwarding the information to other controllers or processors, issuing alerts to a vehicle driver, etc. This disclosure also describes example frame formats that may be used by the primary and secondary nodes when wirelessly communicating with each other. These frame formats include various elements, such as security and frame control elements, that facilitate and enhance wireless communications between the primary and secondary nodes. A wireless BMS resolves the challenges associated with wired communications as described above, including increased vehicle weight, vehicle inefficiencies, and battery cell replacement difficulties. These and other aspects are discussed in greater detail below.

Figure 1:
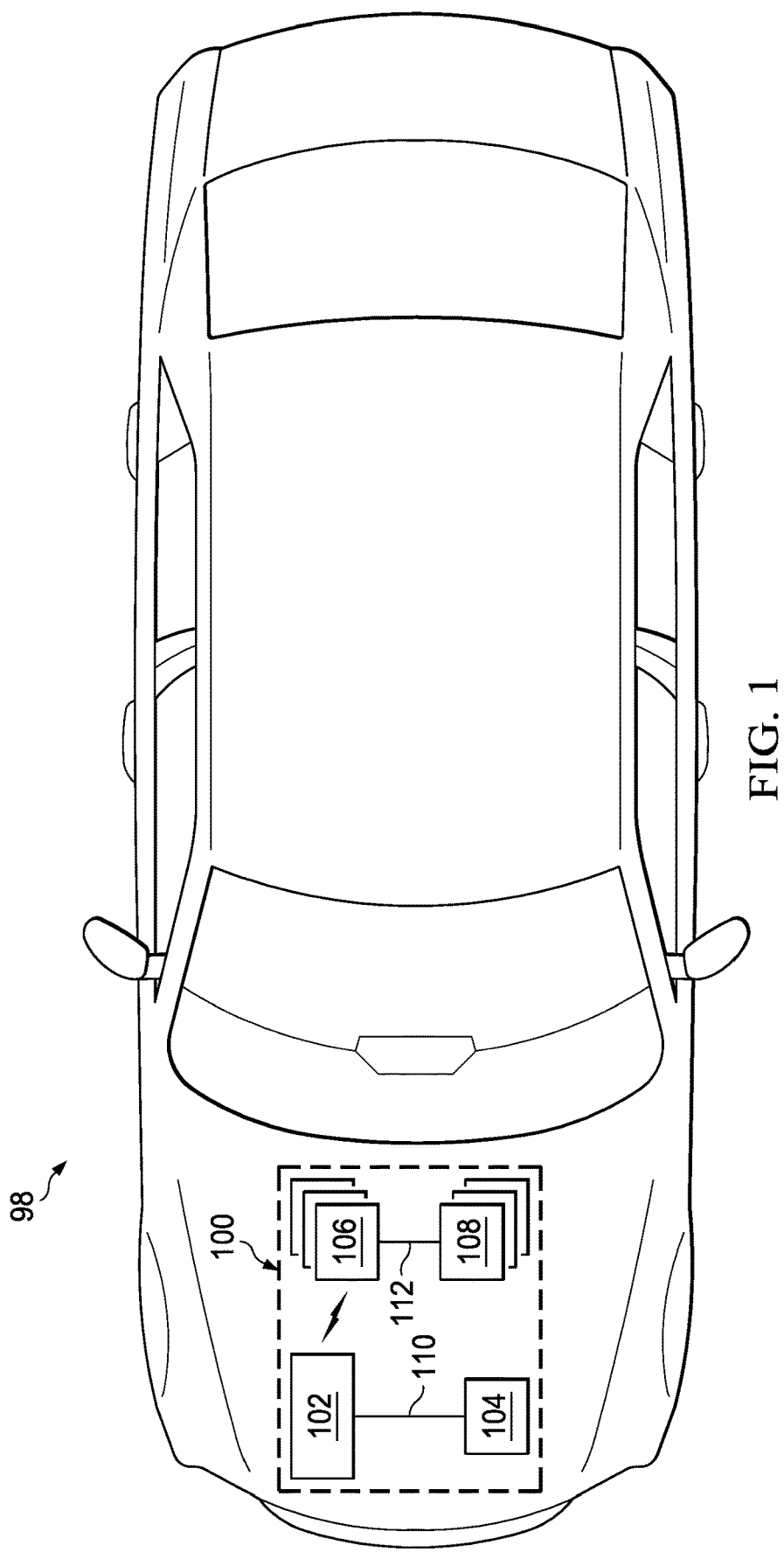
FIG. 1 is a block diagram of a wireless battery management system according to an example of this disclosure.

FIG. 1 is a top-down view of an example system 98, such as an automotive vehicle, that includes a wireless battery management system 100. In some examples, the system 98 is any system that may include a wireless battery management system to supply power to one or more components of the system 98. As shown, the wireless battery management system 100 includes a primary network node 102, a battery controller 104, a plurality of secondary network nodes 106, and a plurality of battery cells 108. In an example, the wireless battery management system 100 may include a plurality of primary network nodes.

In an example, the primary network node 102 is coupled to the battery controller 104 using a first wired connection 110. In an example, the first wired connection 110 between the primary network node 102 and the battery controller 104 is a universal asynchronous receiver/transmitter (UART), SPI, inter-integrated circuit (I2C), or the like. The secondary network nodes 106 are wirelessly coupled to the primary network node 102 and coupled to the battery cells 108 using a second wired connection 112.

In an example, the wireless battery management system 100 provides wireless radio frequency (RF) communication between the primary network node 102 and the secondary network nodes 106. In an example, the wireless RF communication uses the license-free 2.4 gigahertz (GHz) industrial, scientific, and medical (ISM) band from 2.4 GHz to 2.483 GHz, which is compliant with BLUETOOTH special interest group (SIG). The wireless battery management system 100 uses 2 megabits per second (Mbps) BLUETOOTH low energy (BLE) across the physical layer (PHY). The Open Systems Interconnection (OSI) model includes the PHY as a layer used for communicating raw bits over a physical medium. In this case, the PHY is free space, which the wireless battery management system 100 uses to wirelessly communicate between the primary network node 102 and the secondary network nodes 106. In an example, the transmission power of the wireless battery management system 100 is less than or equal to 10 decibel-milliwatts (dBm).

In an example, the wireless RF communication between the primary network node 102 and the secondary network nodes 106 utilizes frequency hopping and time slotted allocations to transmit and receive data across super frames (SFs). A super frame is a time interval including time and frequency allocations for data exchanges between the primary network node 102 and the secondary network nodes 106, including interframe spacing between these allocations. Frequency hopping includes transmitting RF signals by rapidly changing the transmission frequency among many distinct frequencies occupying a spectral band. In an example, frequency hopping occurs based on a linear shift-back register and a master identification (ID) of the primary network node 102. The linear shift-back register uses linear bit rotation to indicate a pattern of frequencies on which the primary network node 102 and the secondary network nodes 106 will communicate. Time slotted allocations are time slots that are assigned either to the primary network node 102 or one or more of the secondary network nodes 106 for transmitting to either one or more of the secondary network nodes 106 or the primary network node 102. The time slotted allocations occur in a half-duplex mode, as both the primary network node 102 and the secondary network nodes 106 switch between transmit and receive modes according to the temporal moment specified in scan/pairing frames of exchanged data for downlink (DL)/uplink (UL) durations.

In an example, the wireless battery management system 100 uses frequency division multiple access (FDMA) and changes the frequency at which frames are transmitted between the primary network node 102 and the secondary network nodes 106 to increase robustness against interference. In an example, the wireless battery management system 100 uses frequency hopping tables, black listing of frequencies, and configuration channels to mitigate interference with other wireless networks. Frequency hopping occurs on a per SF basis, where during the SF, time slotted allocations are used for frame exchange. Black listing is suspending the use of frequency channels that may be susceptible to interference. Configuration channels may be used for scanning, pairing, and negotiating communication between the primary network node 102 and the secondary network nodes 106.

In an example, the wireless RF communication between the primary network node 102 and the secondary network nodes 106 uses 40 channels, where a subset of the 40 channels (e.g., channels 37, 38, and 39) is used for system configuration and the remaining 37 channels are used to exchange data. In an example, a single channel may be used as a configuration channel.

In an example, the wireless battery management system 100 supports periodic and a-periodic data exchanges from the secondary network nodes 106 to the primary network node 102 using wireless RF communication. The primary network node 102 and the secondary network nodes 106 use a common data format structure for both periodic and a-periodic data exchanges. Periodic data exchange occurs based on a repetitive interval, while a-periodic data exchange does not occur based on a repetitive interval. The data format is a description of rules that the data populating a file will follow. Generally, the more thorough the description of the data format, the easier it is for validation rules to be written on both the sending and receiving sides of the wireless battery management system 100.

In an example, the primary network node 102 scans the network to obtain a master ID and discover the secondary network nodes 106. The primary network node 102 scans the network by transmitting a management frame to coordinate medium access, wakeup schedules, and clock synchronization within the secondary network nodes 106. The primary network node 102 also uses the management frame to learn about the secondary network nodes 106 in the network. Initially, the primary network node 102 performs a passive scan to obtain (or check for) a master ID value in use by other nodes and/or devices. The primary network node 102 then selects a master ID that is different from the master IDs used by other nodes and/or devices.

In an example, after the primary network node 102 has selected a master ID, the primary network node 102 transmits a scan request frame in every SF period as long as there are unconnected secondary network nodes 106 from the primary network node 102. In an example, the primary network node 102 is programmed with the total number of the secondary network nodes 106 to be connected to the primary network node 102. After all the secondary network nodes 106 are connected and confirmed, the primary network node 102 will not transmit any more scan requests. The scan request frames include information about the structure of the SF and the frame formatting of the DL and UL slots.

For the primary network node 102 to scan for the secondary network nodes 106, the primary network node 102 enters a scan state. In this state, the primary network node 102 transmits a scan request frame in every SF period. The secondary network nodes 106 reply to the primary network node 102 with a scan response and await a pairing request frame from the primary network node 102. After the secondary network nodes 106 receive the pairing request, the secondary network nodes 106 respond within the same SF in the frequency slot assigned by the primary network node 102. In examples, this exchange occurs in the configuration channels. No data exchanges occur in this state.

In an example, transmission cycles or SFs depend on the number of secondary network nodes 106 and/or battery cells 108 in the network. The primary network node 102 determines the SF interval based on the number of secondary network nodes 106. Given a number of secondary network nodes 106, the primary network node 102 estimates the number of DL slots usable to transmit the packets to the secondary network nodes 106. Accordingly, the total number of slots in the communication time interval becomes the following:

Total_slots=nr_of_WD+nr_DL_slots, where nr_or_WD is the number of secondary network devices and nr_DL_slots is the number of DL slots available to the secondary network devices.

The wireless battery management system 100 manages the battery cells 108 using the primary network node 102, the battery controller 104, and the secondary network nodes 106. The primary network node 102 and the secondary network nodes 106 communicate with each other about the state of the battery cells 108. The primary network node 102 and the secondary network nodes 106 may communicate with each other using various protocol formats. For example, the primary network node 102 and the secondary network nodes 106 use a DL protocol format and a UL protocol format, where each of the DL protocol format and the UL protocol format includes a frame control field to communicate battery management information. When the battery cells 108 notify the secondary network nodes 106 of a condition, the secondary network nodes 106 communicate to the primary network node 102 that the condition is present. The primary network node 102 receives the notification of the condition from the secondary network nodes 106 and alerts the battery controller 104 of the condition. The battery controller 104 determines a proper reaction to the condition and sends an instruction to the primary network node 102. The primary network node 102 transmits the instruction to the secondary network nodes 106. The secondary network nodes 106 receive the instruction to manage the battery cells 108 in response to the condition. The secondary network nodes 106 manage the battery cells 108 in response to the condition.

Figure 2A:
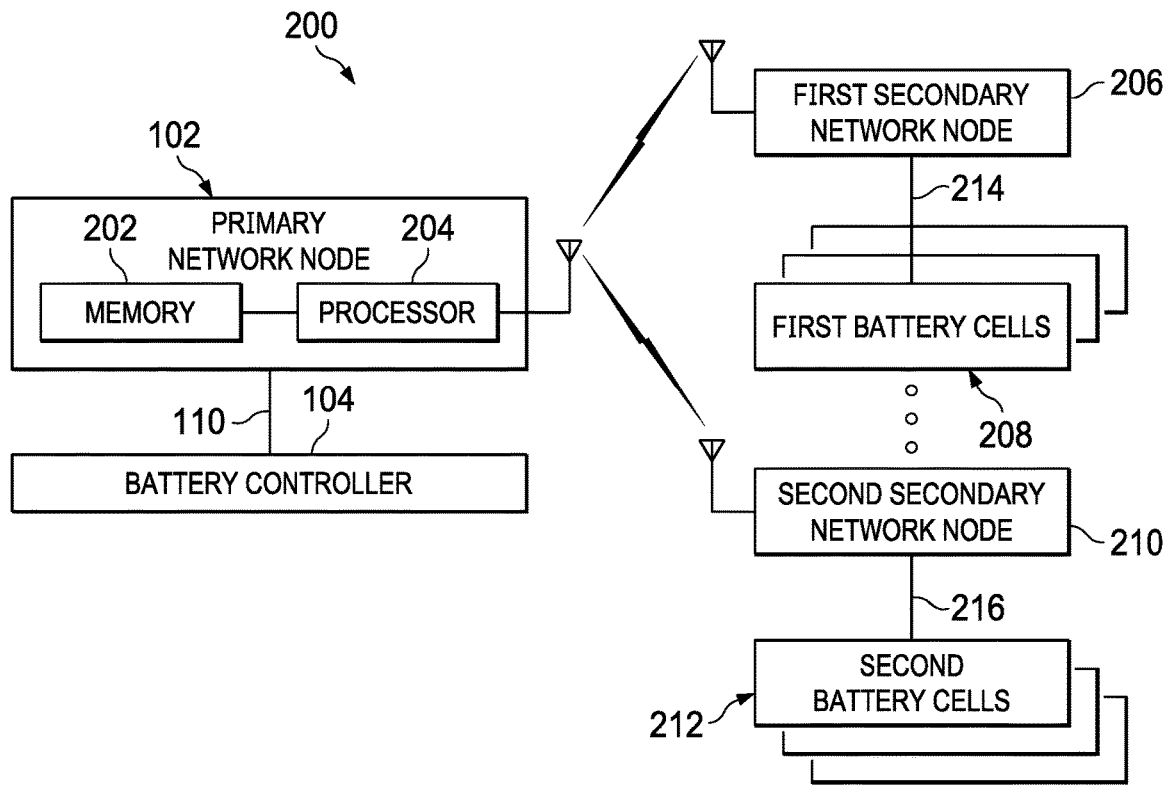
FIG. 2A is a block diagram of a wireless battery management system according to an example of this disclosure.

FIG. 2A illustrates an example wireless battery management system 200. The wireless battery management system 200 is an example of the wireless battery management system 100 described above. As shown, the wireless battery management system 200 includes the primary network node 102, the battery controller 104, a memory 202, a processor 204, a first secondary network node 206, a first plurality of battery cells 208, a second secondary network node 210, and a second plurality of battery cells 212. Additional secondary network nodes 206, 210 may be included, although they are not expressly shown. The primary network node 102 includes the memory 202 and the processor 204. In an example, a portion of the memory 202 may be non-transitory and a portion of the memory 202 may be transitory.

The primary network node 102 is coupled to the battery controller 104 using the first wired connection 110 and is wirelessly coupled to each of the secondary network nodes 206, 210. The first secondary network node 206 is coupled to the first plurality of battery cells 208 using a third wired connection 214 and wirelessly coupled to the primary network node 102. The second secondary network node 210 is coupled to the second plurality of battery cells 212 using a fourth wired connection 216 and wirelessly coupled to the primary network node 102. FIG. 2A does not limit the number of secondary network nodes in the wireless battery management system 200; rather, the naming convention indicates that each of the secondary network nodes is coupled to a plurality of battery cells.

In an example, the primary network node 102 is wirelessly coupled to at least eight secondary network nodes 206, 210. In an example, each of the secondary network nodes 206, 210 can be coupled to at least 16 battery cells using a wired connection. In examples, the wireless battery management system 200 includes one primary network node. In other examples, the wireless battery management system 200 includes multiple primary network nodes.

The wireless battery management system 200 manages the first plurality of battery cells 208 and the second plurality of battery cells 212 using the primary network node 102, the battery controller 104, the memory 202, the processor 204, the first secondary network node 206, and the second secondary network node 210. Instructions in the memory 202 cause the processor 204 to instruct the primary network node 102 to wirelessly communicate with the first secondary network node 206 and the second secondary network node 210 about the state of the first plurality of battery cells 208 and the second plurality of battery cells 212. The primary network node 102 and the secondary network nodes 206, 210 communicate using various protocol formats. For example, the primary network node 102 and the secondary network nodes 206, 210 use a DL protocol format and a UL protocol format, where each of the DL protocol format and the UL protocol format includes a frame control field to communicate battery management information. When the first plurality of battery cells 208 notify the first secondary network node 206 of a condition, the first secondary network node 206 communicates with the primary network node 102 that the condition is present. The primary network node 102 receives the notification of the condition from the first secondary network node 206 and alerts the battery controller 104 of the condition. The battery controller 104 determines a proper reaction to the condition and sends an instruction to the primary network node 102. The primary network node 102 transmits the instruction to the first secondary network node 206. The first secondary network node 206 receives the instruction to manage the first plurality of battery cells 208 in response to the condition of the first plurality of battery cells 208. The first secondary network node 206 manages the first plurality of battery cells 208 in response to the condition. A similar process may apply to the second secondary network node 210 when a condition is present in the second plurality of battery cells 212.

Figure 2B:
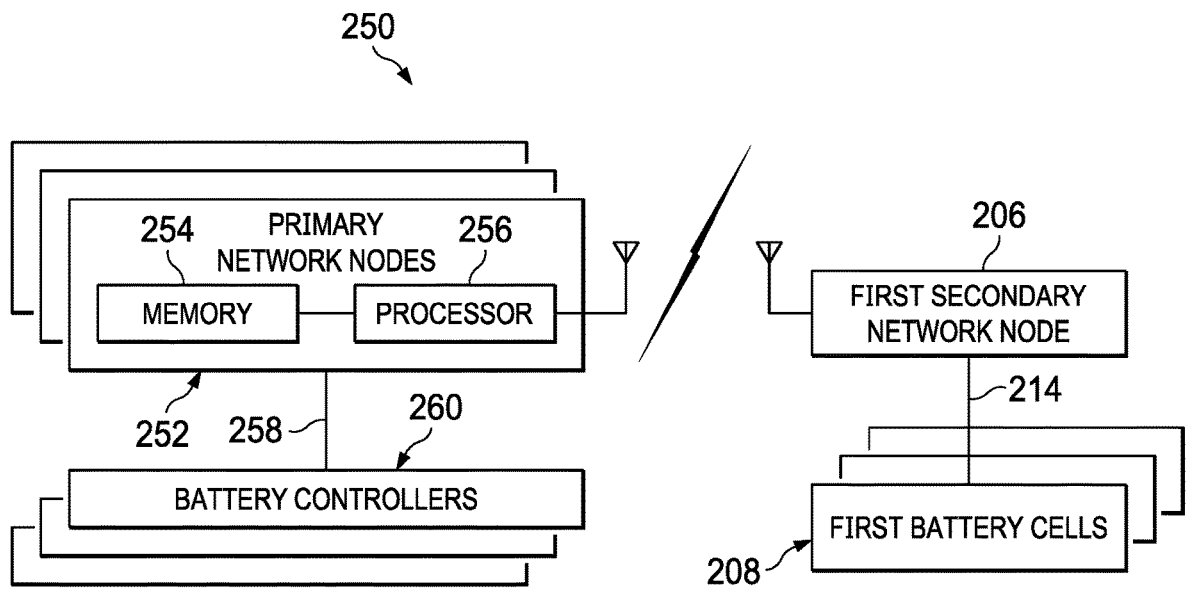
FIG. 2B is a block diagram of a wireless battery management system according to an example of this disclosure.

FIG. 2B illustrates an example wireless battery management system 250. The wireless battery management system 250 is an example of the wireless battery management system 100 described above. As shown, the wireless battery management system 250 includes the first secondary network node 206, the first plurality of battery cells 208, a plurality of primary network nodes 252, a memory 254, a processor 256, a first wired connection 258, and a plurality of battery controllers 260. The plurality of primary network nodes 252 includes the memory 254 and the processor 256. In an example, a portion of the memory 254 may be non-transitory and a portion of the memory 254 may be transitory.

The plurality of primary network nodes 252 are coupled to the plurality of battery controllers 260 using the first wired connection 258 and are wirelessly coupled to the secondary network node 206. The first secondary network node 206 is coupled to the first plurality of battery cells 208 using the wired connection 214 and wirelessly coupled to the plurality of primary network nodes 252. FIG. 2B does not limit the number of secondary network nodes in the wireless battery management system 250. In an example, each of the plurality of primary network nodes 252 is wirelessly coupled to at least eight secondary network nodes. In an example, the first secondary network node 206 can be coupled to at least 16 battery cells using the third wired connection 216.

The wireless battery management system 250 manages the first plurality of battery cells 208 using the plurality of primary network nodes 252, the plurality of battery controllers 260, the memory 254, the processor 256, and the first secondary network node 206. Instructions in the memory 254 cause the processor 256 to instruct the plurality of primary network nodes 252 to wirelessly communicate with the first secondary network node 206 about the state of the first plurality of battery cells 208. The plurality of primary network nodes 252 and the first secondary network node 206 communicate using various protocol formats. For example, the plurality of primary network nodes 252 and the first secondary network node 206 use a DL protocol format and a UL protocol format, where each of the DL protocol format and the UL protocol format includes a frame control field to communicate battery management information. When the first plurality of battery cells 208 notify the first secondary network node 206 of a condition, the first secondary network node 206 communicates with the plurality of primary network nodes 252 that the condition is present. The plurality of primary network nodes 252 receives the notification of the condition from the first secondary network node 206 and alerts the plurality of battery controllers 260 of the condition. The plurality of battery controllers 260 determines a proper reaction to the condition and sends an instruction to the plurality of primary network nodes 252. The plurality of primary network nodes 252 transmits the instruction to the first secondary network node 206. The first secondary network node 206 receives the instruction to manage the first plurality of battery cells 208 in response to the condition of the first plurality of battery cells 208. The first secondary network node 206 manages the first plurality of battery cells 208 in response to the condition.

In an example, the first secondary network node 206 communicates with a first primary network node of the plurality of primary network nodes 252 based on instructions from a master controller (not shown). The first secondary network node 206 can transition communication from the first primary network node to a second primary network node of the plurality of primary network nodes 252. The first primary network node and the second primary network node communicate with each other to coordinate transferring the active connections of the first secondary network node 206 from the first primary network node to the second primary network node. In an example, the first primary network node communicates with the first secondary network node 206 and the second primary network node monitors a status of the first primary network node. The status can indicate whether the first primary network node has power and is operating within normal operating conditions. The first primary network node provides a clock signal to the second primary network node to synchronize communication. The first primary network node and the second primary network node select different frequencies to communicate with the first secondary network node 206. Selecting different frequencies allows the plurality of primary network nodes 252 to minimize interference when communicating to the first secondary network node 206. For example, if the first primary network node were to lose power, or if the status of the first primary network node were to fall out of normal operating conditions, then the second primary network node can connect to the first secondary network node 206 to supplement communication until the first primary network node can operate normally again.

Figure 3:
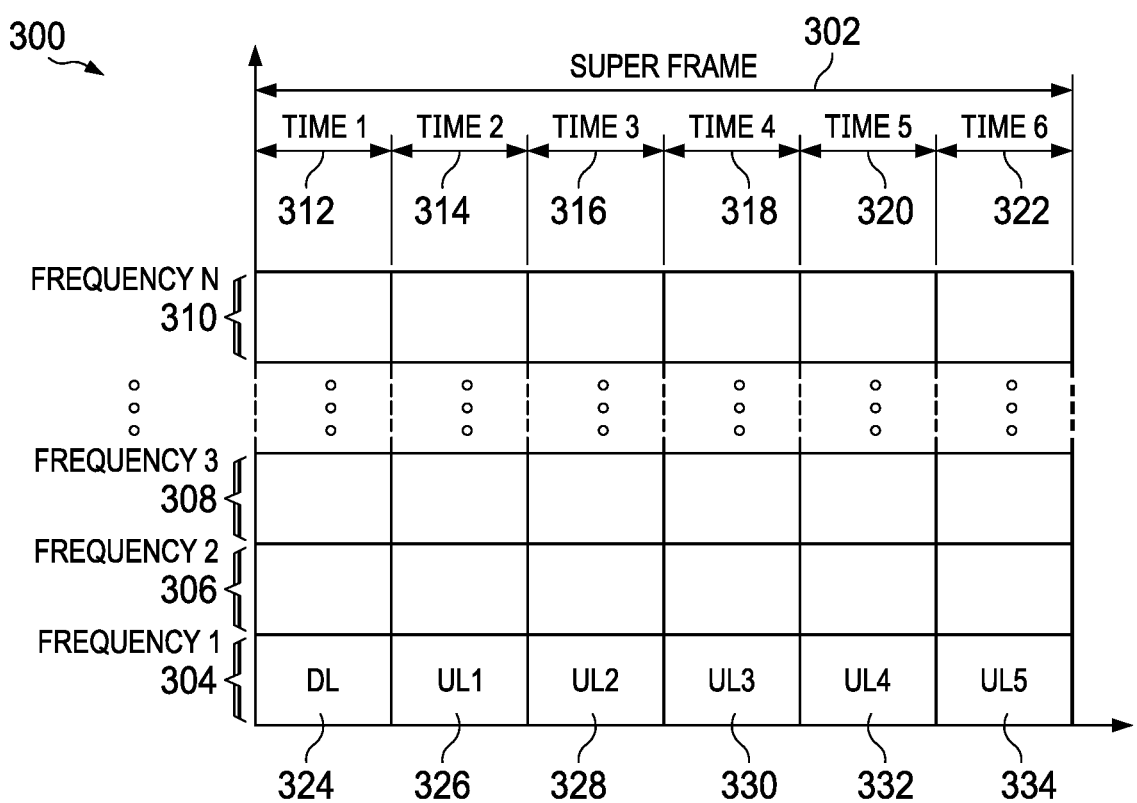
FIG. 3 is an illustration of a communication frame used by a wireless battery management system according to an example of this disclosure.

FIG. 3 illustrates a communication frame 300 used by a wireless battery management system, e.g., the wireless battery management system 100. As shown, the communication frame 300 includes an SF 302, a first frequency 304, a second frequency 306, a third frequency 308, and an Nth frequency 310, a first time frame 312, a second time frame 314, a third time frame 316, a fourth time frame 318, a fifth time frame 320, a sixth time frame 322, a DL frame 324, a first UL frame 326, a second UL frame 328, a third UL frame 330, a fourth UL frame 332, and a fifth UL frame 334. Frequency is denoted by the y-axis and time is denoted by the x-axis. Each of the time frames 312, 314, 316, 318, 320, 322 is configurable based on the end application of the wireless battery management system.

The communication frame 300 is used by a wireless battery management system to communicate battery management information between the primary network node and the secondary network nodes. In an example, during the SF 302, the primary network node transmits the DL frame 324 on the first frequency 304 during the first time frame 312. During the first time frame 312, at least one of the secondary network nodes receives the DL frame 324. The DL frame 324 can be transmitted by the primary network node in a broadcast manner or transmitted by the primary network node in a unicast manner. A broadcast includes the primary network node transmitting the DL frame 324 to all of the secondary network nodes in a single time frame. A unicast includes the primary network node transmitting the DL frame 324 to one of the secondary network nodes during one time frame.

In an example, a broadcast is used by the primary network node to transmit the DL frame 324 to all of the secondary network nodes during the first time frame 312. A first secondary network node transmits the first UL frame 326 on the first frequency 304 during the second time frame 314 in response to receiving the DL frame 324 from the primary network node. A second secondary network node transmits the second UL frame 328 on the first frequency 304 during the third time frame 316 in response to receiving the DL frame 324 from the primary network node. A third secondary network node transmits the third UL frame 330 on the first frequency 304 during the fourth time frame 318 in response to receiving the DL frame 324 from the primary network node. A fourth secondary network node transmits the fourth UL frame 332 on the first frequency 304 during the fifth time frame 320 in response to receiving the DL frame 324 from the primary network node. A fifth secondary network node transmits the fifth UL frame 334 on the first frequency 304 during the sixth time frame 322 in response to receiving the DL frame 324 from the primary network node. In this example, the SF 302 ends at the end of the sixth time frame 322.

In an example, a unicast is used by the primary network node to transmit the DL frame 324 to a first secondary network node on the first frequency 304 during the first time frame 312. During the first time frame 312, the first secondary network node receives the DL frame 324. The first secondary network node transmits the first UL frame 326 on the first frequency 304 during the second time frame 314 in response to receiving the DL frame 324. In an example where there is a single primary network node and a single secondary network node, the SF 302 ends at the end of the second time frame 314.

In an example, the primary network node and the secondary network nodes may communicate on one of the frequencies other than the first frequency 304, such as the second frequency 306, the third frequency 308, the Nth frequency 310, or the like. A change in the frequency used may be caused by the frequency hopping method in the foregoing discussion. In an example, a length of time of each of the time frames may be different or the same depending on an end application of the wireless battery management system. In an example, the secondary network nodes acknowledge receipt of the DL frame 324 using an acknowledgment code (ACK) and the primary network node acknowledges receipt of the UL frames 326, 328, 330, 332, 334 using an ACK. An ACK is a type of signal between a sender and recipient to acknowledge successful receipt of communication.

Figure 4A:
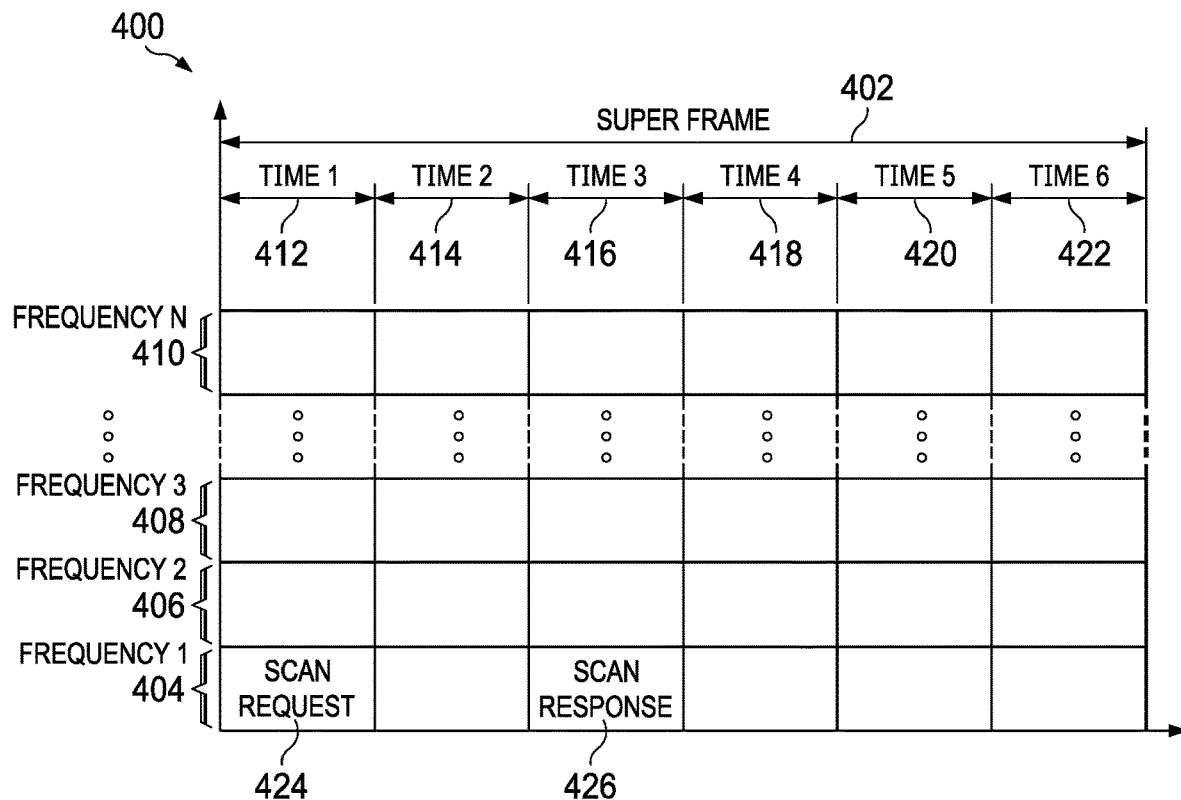
FIG. 4A is an illustration of a scan communication frame used by a wireless battery management system according to an example of this disclosure.

FIG. 4A illustrates a scan communication frame 400 used by a wireless battery management system, e.g., the wireless battery management system 100. As shown, the scan communication frame 400 includes an SF 402, a first frequency 404, a second frequency 406, a third frequency 408, and an Nth frequency 410, a first time frame 412, a second time frame 414, a third time frame 416, a fourth time frame 418, a fifth time frame 420, a sixth time frame 422, a scan request frame 424, and a scan response frame 426. Frequency is denoted by the y-axis and time is denoted by the x-axis. And each of the frames is active for a predetermined time.

The scan communication frame 400 is used by a wireless battery management system for the primary network node to scan for the secondary network nodes to establish communication. In an example, during the SF 402, the primary network node transmits the scan request frame 424 on the first frequency 404 during the first time frame 412 to the secondary network nodes. During the first time frame 412, the secondary network nodes receive the scan request frame 424. The scan request frame 424 includes information about the structure of the SF 402 and the frame formatting of the DL and UL slots, such as coordination information for communication, wakeup schedules for when the secondary network nodes sleep, and clock synchronization within the primary network node and secondary network nodes. The secondary network nodes transmit the scan response frame 426 to the primary network node on the first frequency 404 during the third time frame 416. The scan response frame 426 includes information indicating whether the secondary network nodes are unconnected from the primary network node and require pairing. Pairing, in this case, involves a procedure used by the primary network node and the secondary network nodes to establish a wireless connection and share security information.

In an example, the secondary network nodes that are unconnected from the primary network node respond to the scan request frame 424 with the scan response frame 426. A time frame (or slot frame) at which the secondary network nodes start transmitting the scan response frame 426 may be calculated as follows:

$$\text{SlotFrame}N = \text{SwitchInfo}N + \text{SumBytes}(\text{UniqueID}(i)) \mod(4 * nr\_of\_nodes)$$

where "SwitchInfoN" is the number of SFs in a SwitchInfo field of a protocol format, "UniqueID(i)" is an identifier of one of the secondary network nodes, and "nr_of_nodes" is the number of secondary nodes that are connected to the primary network node. The SwitchInfo field of the protocol format includes the SFs for communication between the primary network nodes and the secondary network nodes.

Figure 4B:
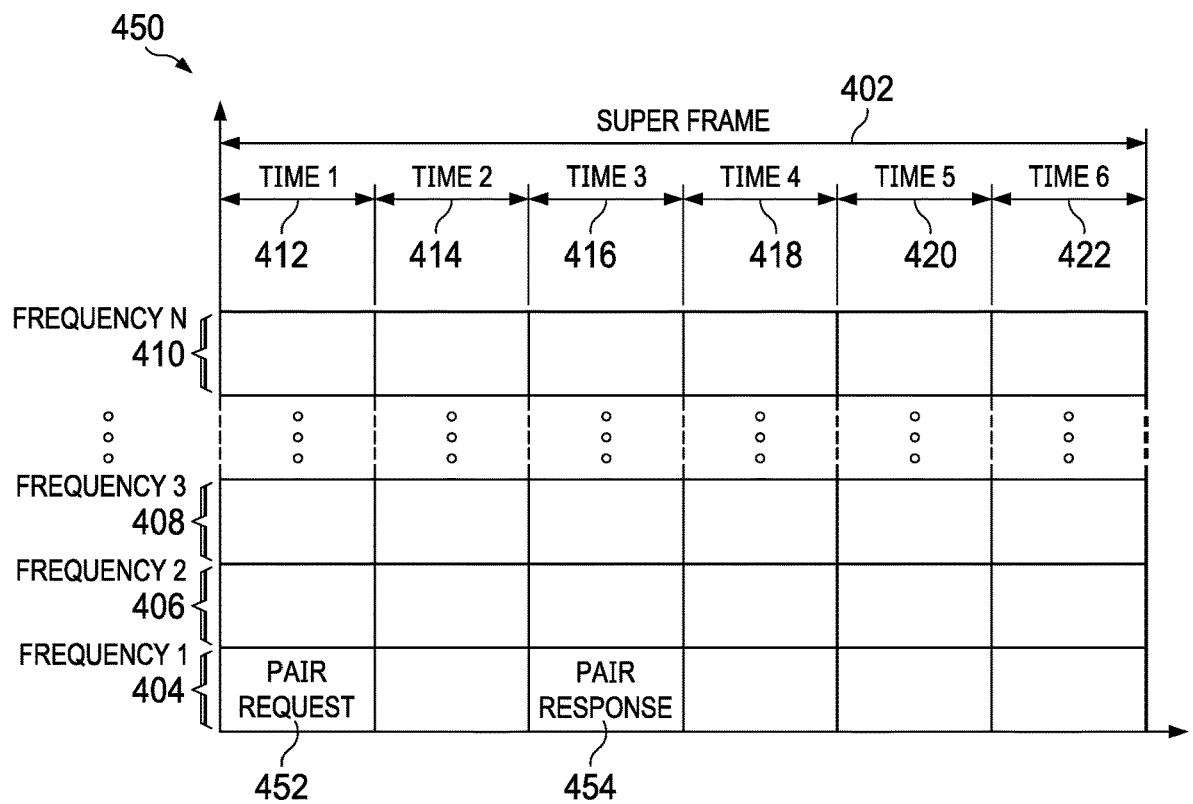
FIG. 4B is an illustration of a pairing communication frame used by a wireless battery management system according to an example of this disclosure.

FIG. 4B illustrates a pairing communication frame 450 used by a wireless battery management system, e.g., the wireless battery management system 100. As shown, the pairing communication frame 450 includes an SF 402, a first frequency 404, a second frequency 406, a third frequency 408, and an Nth frequency 410, a first time frame 412, a second time frame 414, a third time frame 416, a fourth time frame 418, a fifth time frame 420, a sixth time frame 422, a pair request frame 452, and a pair response frame 454. Frequency is denoted by the y-axis and time is denoted by the x-axis. Each of the frames is active for a predetermined time.

The pairing communication frame 450 is used by a wireless battery management system to pair the primary network node and the secondary network nodes to establish communication. In an example, during the SF 402, the primary network node transmits the pair request frame 452 on the first frequency 404 during the first time frame 412 to one of the secondary network nodes that is unconnected to the primary network node. The pair request frame 452 includes connection parameters for the secondary network nodes that are unconnected to the primary network node such as time frames to be used for UL/DL, channel hopping information, and security information. After the secondary network node receives the pair request frame 452, the secondary network node responds with the pair response frame 454. The pair response frame 454 indicates successful pairing between the primary network node and the secondary network nodes.

In an example, the primary network node transmits the pair request frame 452 to more than one of the secondary network nodes. If the primary network node transmits the pair request frame 452 to more than one of the secondary network nodes, then there will be purposeful delays in pairing between the primary network node and the secondary network nodes. The delays in pairing will be to ensure network timing between the primary network node and the secondary network nodes is consistent across the secondary network nodes. The delays between pairing gives the primary network node enough time to establish communication with each of the secondary network nodes. Having the network timing consistent across the secondary network nodes allows synchronous communication between the primary network node and the secondary network nodes.

Figure 5:
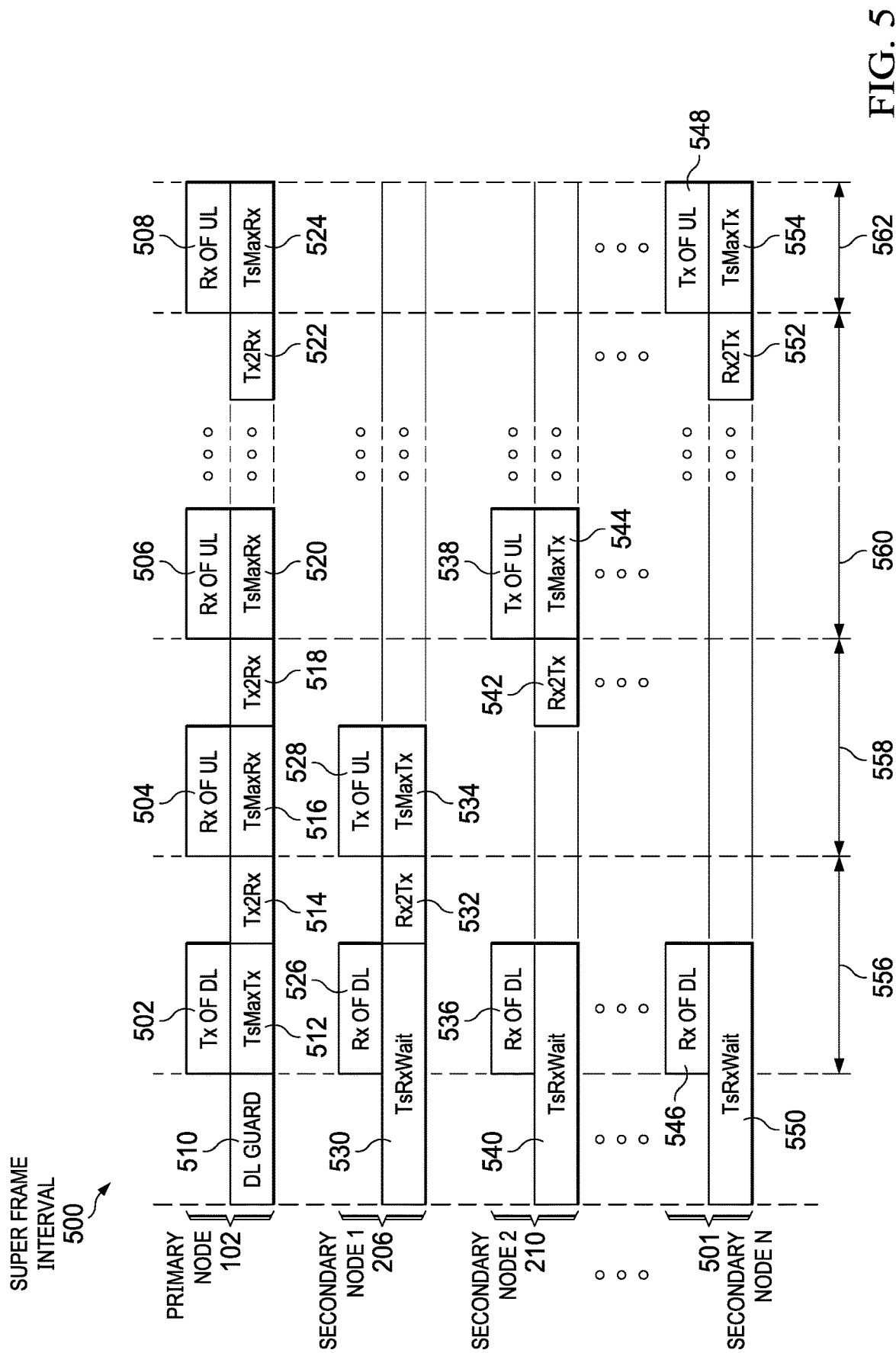
FIG. 5 is an illustration of a super frame interval used by a wireless battery management system according to an example of this disclosure.

FIG. 5 illustrates a super frame interval 500 used by a wireless battery management system, e.g., the wireless battery management system 100. The primary network node 102 communicates with the first secondary network node 206, the second secondary network node 210, and an Nth secondary network node 501 using, for example, the super frame interval 500. As shown, the super frame interval 500 includes a DL transmit frame 502, a first UL receive frame 504, a second UL receive frame 506, a third UL receive frame 508, a DL guard frame 510, a DL transmit time frame 512, a first transmit to receive frame 514, a first UL receive time frame 516, a second transmit to receive frame 518, a second UL receive time frame 520, a third transmit to receive frame 522, a third UL receive time frame 524, a first DL receive frame 526, a first UL transmit frame 528, a first receive wait time 530, a first receive to transmit frame 532, a first UL transmit time frame 534, a second DL receive frame 536, a second UL transmit frame 538, a second receive wait time 540, a second receive to transmit frame 542, a second UL transmit time frame 544, a third DL receive frame 546, a third UL transmit frame 548, a third receive wait time 550, a third receive to transmit frame 552, a third UL transmit time frame 554, a first frame 556, a second frame 558, a third frame 560, and a fourth frame 562.

The super frame interval 500 is used by a wireless battery management system to organize communication between the primary network node 102 and the secondary network nodes 106 for wireless battery management purposes. In an example, the super frame interval 500 is a medium access control (MAC) for data exchange between the primary network node 102 and the first secondary network node 206, the second secondary network node 210, and the Nth secondary network node 501. Each of the secondary network nodes 206, 210, 501 in the super frame interval 500 communicates with the primary network node 102 during a time slot as discussed with reference to FIG. 3. The primary network node 102 identifies which secondary network nodes 206, 210, 501 to communicate with based on an availability of the secondary network nodes 206, 210, 501. The availability of the secondary network nodes 206, 210, 501 is determined by a scanning process as discussed with reference to FIG. 4A. The time slot for the secondary network nodes 206, 210, 501 to communicate with the primary network node 102 is assigned when the primary network node 102 and the secondary network nodes 206, 210, 501 are paired as discussed with reference to FIG. 4B.

In an example, the super frame interval 500 starts with the DL guard frame 510. The DL guard frame 510 is a time period used to ensure there is no interference between subsequent SFs. At the time of the DL guard frame 510, the first secondary network node 206 enters the first receive wait time 530, the second secondary network node 210 enters the second receive wait time 540, and the Nth secondary network node 501 enters the third receive wait time 550.

In the first frame 556 of the super frame interval 500, after the DL guard frame 510, the primary network node 102 transmits the DL using the DL transmit frame 502 during the DL transmit time frame 512 to all of the secondary network nodes 206, 210, 501. In an example, the first frame 556 is the first time frame 312 as discussed with respect to FIG. 3. The first secondary network node 206 receives the DL using the first DL receive frame 526, the second secondary network node 210 receives the DL using the second DL receive frame 536, and the Nth secondary network node 501 receives the DL using the third DL receive frame 546. After the DL transmit frame 502, the primary network node 102 enters the first transmit to receive frame 514 in preparation to receive the ULs from each of the secondary network nodes 206, 210, 501. At the same time as the primary network node 102 enters the first transmit to receive frame 514, the first secondary network node 206 enters the first receive to transmit frame 532 in preparation to transmit a first UL to the primary network node 102.

In the second frame 558 of the super frame interval 500, the first secondary network node 206 transmits the first UL using the first UL transmit frame 528 and during the first UL transmit time frame 534. In an example, the second frame 558 is the second time frame 314 as discussed with respect to FIG. 3. The primary network node 102 receives the first UL using the first UL receive frame 504 and during the first UL receive time frame 516. In the second frame 558, the primary network node 102 enters the second transmit to receive frame 518 in preparation to receive a second UL from the second secondary network node 210. And the second secondary network node 210 enters the second receive to transmit frame 542 in preparation to transmit a second UL to the primary network node 102.

In the third frame 560 of the super frame interval 500, the second secondary network node 210 transmits the second UL using the second UL transmit frame 538 and during the second UL transmit time frame 544. In an example, the third frame 560 is the third time frame 316 as discussed with respect to FIG. 3. The primary network node 102 receives the second UL using the second UL receive frame 506 and during the second UL receive time frame 520. In the third frame 560, the primary network node 102 enters the third transmit to receive frame 522 in preparation to receive a third UL from the Nth secondary network node 501. And the Nth secondary network node 501 enters the third receive to transmit frame 552 in preparation to transmit a third UL to the primary network node 102.

In the fourth frame 562 of the super frame interval 500, the Nth secondary network node 501 transmits the third UL using the third UL transmit frame 548 and during the third UL transmit time frame 554. In an example, the fourth frame 562 is the sixth time frame 322 as discussed with respect to FIG. 3. The primary network node 102 receives the third UL using the third UL receive frame 508 and during the third UL receive time frame 524.

In an example, the super frame interval 500 lacks any ACK packets, rather, acknowledgement information is within the DL frame and in the UL frames. Keeping the acknowledgement information within the DL frame and the UL frames allows for optimal efficiency (throughput) while reducing latency for data transmissions. In an example, any of the UL transmit frames 528, 538, 548 can be retransmitted by the secondary network nodes 206, 210, 501 based on an ACK from the primary network node 102 for one of the frames of the super frame interval 500. In an example, the DL transmit frame 502 can be retransmitted by the primary network node 102 based on ACK information from the secondary network nodes 206, 210, 501.

In an example, the transmissions of each of the frames of the super frame interval 500 can be at the same frequency or at different frequencies. If the transmissions are at different frequencies, the change in frequency is based on a hopping sequence for the communication of the primary network node 102 and the secondary network nodes 206, 210, 501.

Figure 6:
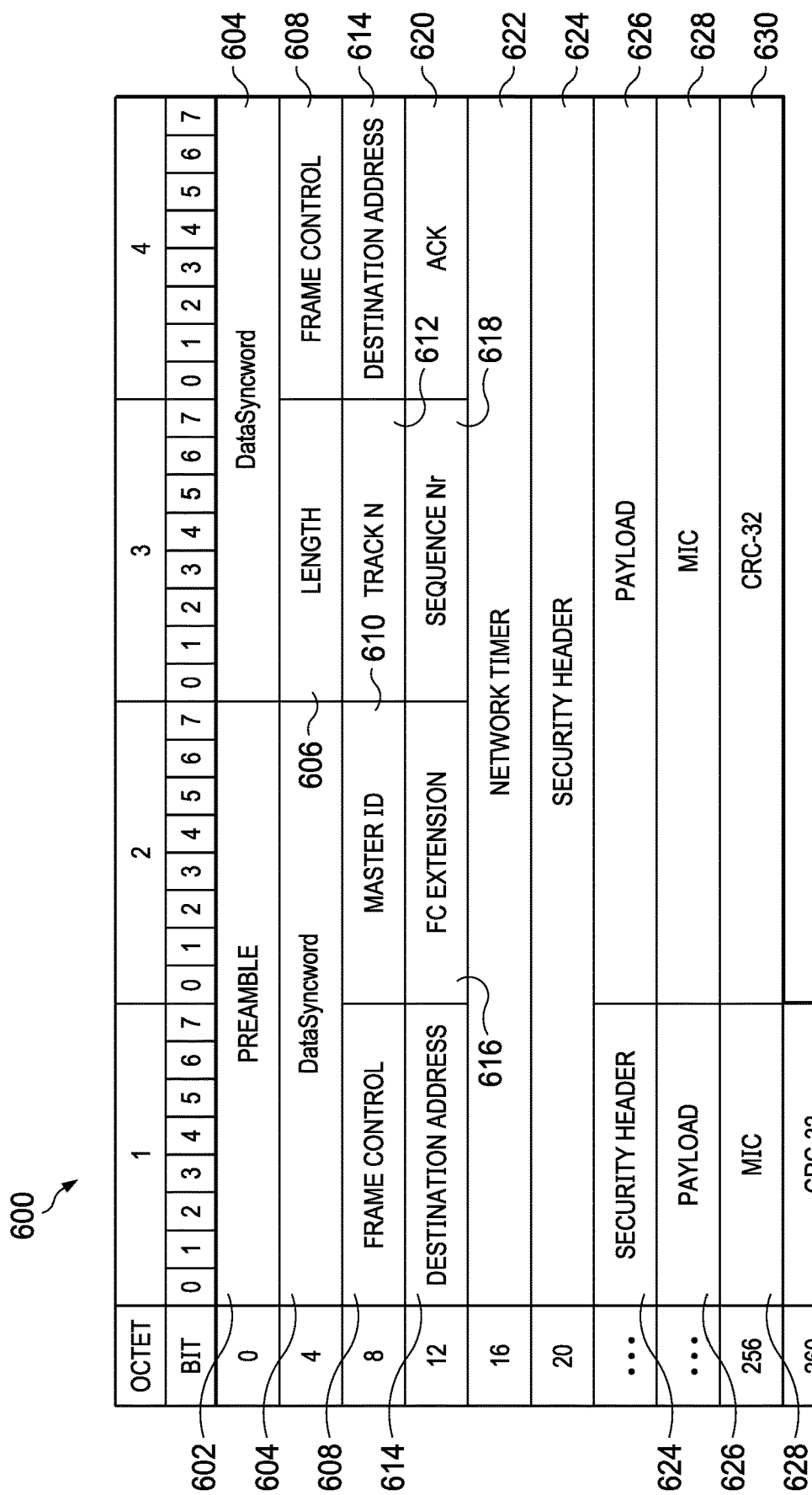
FIG. 6 is an illustration of a downlink protocol format used by a wireless battery management system according to an example of this disclosure.

FIG. 6 illustrates a DL protocol format 600 used by a wireless battery management system, e.g., the wireless battery management system 100. The top row of the DL protocol format 600 labeled as "Octet" represents the octet identifier to assist in describing the format of the DL protocol format 600. In the DL protocol format 600 there are four octets in the protocol representation, each octet with eight bits. The second row of the DL protocol format 600 labeled as "Bit" identifies the bit number of each of the octets to assist in describing the format of the DL protocol format 600. The numbers on the far left of the DL protocol format 600 represent the number of octets prior to the immediate row. For example, the fourth row of the DL protocol format 600 indicates that four octets precede the subsequent octets. As shown, the DL protocol format 600 includes a preamble 602, a data sync word 604, a length field 606, a frame control 608, a master ID 610, a track N frame 612, a destination address (destination addr) frame 614, a frame control extension (FC extension) 616, a sequence number (sequence nr) 618, an ACK 620, a network timer 622, a security header 624, a payload 626, a message integrity code (MIC) field 628, and a 32-bit cyclic redundancy check (CRC-32) 630. The DL protocol format 600 is an example of a DL protocol format and additional fields and/or format types that may be used for a wireless battery management system protocol to accommodate different features.

The DL protocol format 600 is used by a wireless battery management system to wirelessly communicate battery management information. For example, the DL protocol format 600 may be used by the primary network node to instruct the secondary network nodes to pair with the primary network node for battery management purposes. In another example, the DL protocol format 600 may be used in a DL frame as discussed with respect to FIG. 3, after the primary network node scans a network as discussed with respect to FIG. 4A and pairs with the secondary network nodes as discussed with respect to FIG. 4B.

In an example, the preamble 602 and the data sync word 604 are used by the primary network node and the secondary network nodes to detect the beginning of a frame of a data packet being transmitted between the primary network node and the secondary network nodes. The preamble 602 is used to synchronize a data transmission between the primary network node and the secondary network nodes by indicating a start of header information of a data frame, the end of the header information, and the start of a data payload. Here, the data frame is in reference to the entire frame of the DL protocol format 600. The data sync word 604 is used for synchronizing data and configuration channels between the primary network node and the secondary network nodes. The data sync word 604 includes a configuration code that specifies a frequency channel for the primary network node and each of the secondary network nodes to communicate. The length field 606 indicates the length of the data frame. The frame control 608 includes information about the type of the packet being sent. In an example, the type of the packet may be a scan request, a scan response, a pairing request, a pairing response, or the like.

In an example, the master ID 610 is the identifier for the primary network node that the secondary network nodes use to identify the primary network node. The track N frame 612 identifies which transceiver of the primary network node is communicating with the secondary network nodes. The destination address frame 614 indicates the destination address of a recipient of the communication. For example, when communication is in a broadcast manner, each of the secondary network nodes has the same destination address such that the destination address frame 614 applies to all of the secondary network nodes. The frame control extension 616 indicates whether, and by how much, the frame control 608 is extended. The sequence number 618 indicates whether the current data packet is part of an original transmission from the primary network node to the secondary network nodes or is part of a retransmission from the primary network node to the secondary network nodes. The ACK 620 indicates whether a transmission from the primary network node to the secondary network nodes is received. The ACK 620 is a single bit, which causes the secondary network node to set its own ACK to 1 when DL is successfully received (or to remain at 0 when unsuccessful). The network timer 622 indicates a common time between the primary network node and the secondary network nodes. The common time is a time signal shared between the primary network node and the secondary network nodes to allow synchronized communication between the primary network node and the secondary network nodes. The network timer 622 is used to synchronize the secondary network nodes based on a timer of the primary network node.

In an example, the security header 624 includes a frame counter and a key refresh control field. The frame counter is an arbitrary number used once for the primary network node to establish cryptographic communication with the secondary network nodes. The key refresh control field is used to indicate, and complete, updating of the security keys that are exchanged between the primary network node and the secondary network nodes.

The payload 626 includes the data that is the actual intended message to be sent. For example, the payload 626 may include information regarding battery management from the primary network node to the secondary network node. The MIC field 628 is used to confirm the frame is from the stated sender (e.g., the authenticity of the frame) and has not been changed. The MIC field 628 protects data integrity of the frame, as well as its authenticity, by allowing the primary network node and the secondary network nodes to detect any changes to the content of the frame. The CRC-32 630 is used for error detection in the frame the payload 626 is encrypted. The CRC-32 630 detects accidental changes to raw data of the frame by comparing values based on a mathematical function performed on all or part of the content of the data frame, such as the remainder of polynomial division of contents of the data frame.

Figure 7:
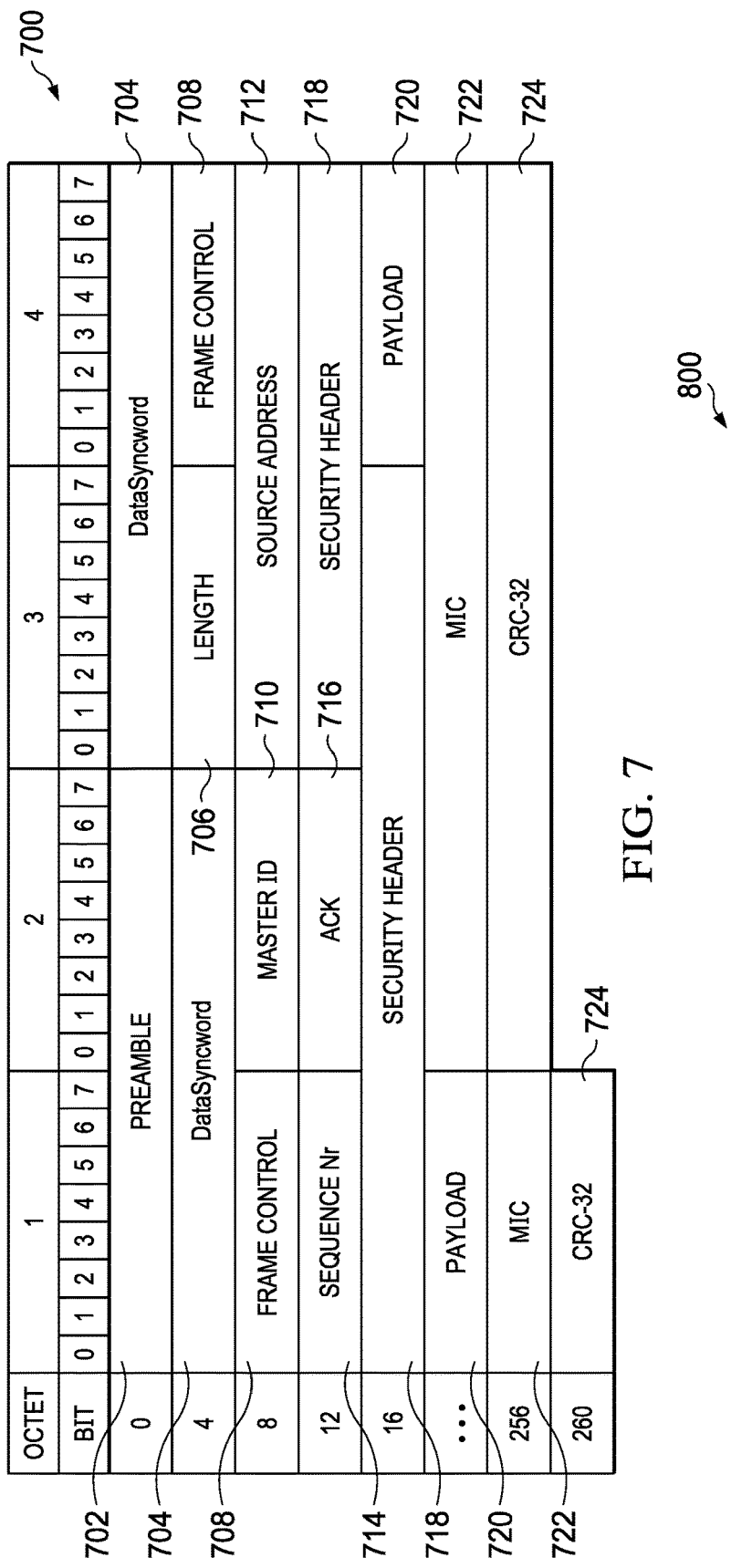
FIG. 7 is an illustration of an uplink protocol format used by a wireless battery management system according to an example of this disclosure.

FIG. 7 illustrates a UL protocol format 700 used by a wireless battery management system, e.g., the wireless battery management system 100. The top row of the UL protocol format 700 labeled as "Octet" represents the octet identifier to assist in describing the format of the UL protocol format 700. In the UL protocol format 700 there are four octets in the protocol representation, each octet with eight bits. The second row of the UL protocol format 700 labeled as "Bit" identifies the bit number of each of the octets to assist in describing the format of the UL protocol format 700. The numbers on the far left of the UL protocol format 700 represent the number of octets prior to the immediate row. For example, the fourth row of the UL protocol format 700 indicates that four octets come before the subsequent octets. As shown, the UL protocol format 700 includes a preamble 702, a data sync word 704, a length field 706, a frame control 708, a master ID 710, a source address frame 712, a sequence number (sequence nr) 714, an ACK 716, a security header 718, a payload 720, a MIC field 722, and a CRC-32 724. The UL protocol format 700 is an example of a UL protocol format and additional fields and/or format types that may be used for a wireless battery management system protocol to accommodate different features.

The UL protocol format 700 is used by a wireless battery management system for the primary network node and the secondary network nodes to wirelessly communicate battery management information. For example, the UL protocol format 700 may be used by the primary network node to instruct the secondary network nodes to pair with the primary network node for battery management purposes. In another example, the UL protocol format 700 may be used in a UL frame as discussed with respect to FIG. 3, after the primary network node scans a network as discussed with respect to FIG. 4A and pairs with the secondary network nodes as discussed with respect to FIG. 4B.

In an example, the preamble 702 and the data sync word 704 are used by the primary network node and the secondary network nodes to detect the beginning of a frame of a data packet being transmitted between the secondary network nodes and the primary network node. The preamble 702 is used to synchronize a data transmission between the secondary network nodes and the primary network node by indicating a start of header information of a data frame, the end of the header information, and the start of a data payload. Here, the data frame is the entire frame of the UL protocol format 700. The data sync word 704 is used for synchronizing data and configuration channels between the secondary network nodes and the primary network node. The data sync word 704 includes a configuration code that specifies a frequency channel for each of the secondary network nodes and the primary network node to communicate. The length field 706 indicates the length of the data frame. The frame control 708 includes information about the type of the packet being sent. In an example, the type of the packet may be a scan request, a scan response, a pairing request, a pairing response, or the like.

In an example, the master ID 710 is the identifier for the primary network node that the secondary network nodes use to identify the primary network node. The source address frame 712 indicates an address assigned by the primary network node to the secondary network nodes. For example, when data is broadcast, each of the secondary network nodes transmits a UL to the primary network node from different source addresses such that the source address frame 712 is unique to each of the secondary network nodes. The sequence number 714 indicates whether the current data packet is part of an original transmission from the primary network node to the secondary network nodes or is part of a retransmission from the primary network node to the secondary network nodes. The ACK 716 indicates whether transmission from the primary network node to the secondary network nodes is received. The ACK 716 is a single bit, which is set to 1 when the DL from the primary network node is successfully received (or remains at 0 when unsuccessful).

In an example, the security header 718 includes a frame counter and a key refresh control field. The frame counter is an arbitrary number used once for the primary network node to establish cryptographic communication with the secondary network nodes. The key refresh control field is used to indicate, and complete, updating of the security keys that are exchanged between the primary network node and the secondary network nodes. The payload 720 includes the data that is the actual intended message to be sent. For example, the payload 720 may include information regarding battery cell health from the secondary network nodes to the primary network node. The MIC field 722 is used to confirm the frame is from the stated sender (its authenticity) and has not been changed. The MIC field 722 protects data integrity of the frame, as well as its authenticity, by allowing the primary network node and the secondary network nodes to detect any changes to the content of the frame. The CRC-32 724 is used for error detection in the frame the payload 720 is encrypted. The CRC-32 724 detects accidental changes to raw data of the frame by comparing values based on a mathematical function performed on all or part of the content of the data frame, such as the remainder of polynomial division of contents of the frame.

Figure 8:
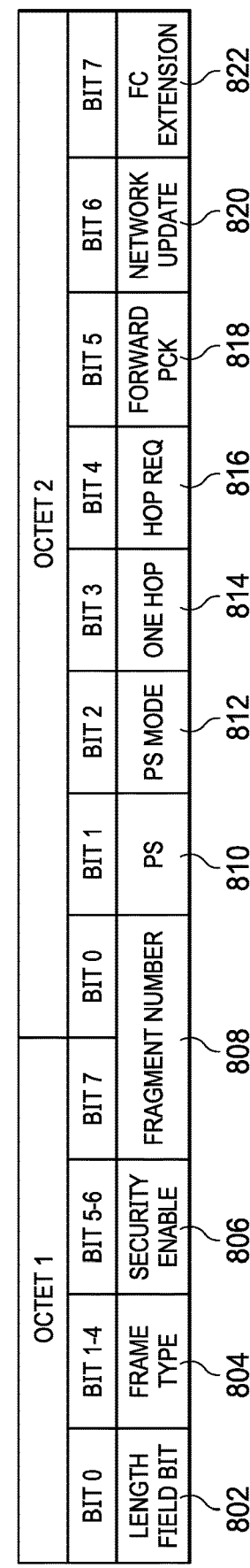
FIG. 8 is an illustration of a frame control format used by a wireless battery management system according to an example of this disclosure.

FIG. 8 illustrates a frame control format 800 used by a wireless battery management system, e.g., the wireless battery management system 100. The top row of the frame control format 800 represents the octet identifier to assist in describing the format of the frame control format 800. In the frame control format 800 there are two octets in the frame control representation, each octet with eight bits. The second row of the frame control format 800 identifies the bit number of each of the octets to assist in describing the format of the frame control format 800. For example, the second row of the frame control format 800 indicates "Bit 0" is used for a length field bit 802. As shown, the frame control format 800 includes a length field bit 802, a frame type 804, a security enable 806, a fragment number 808, a power save (PS) 810, a PS mode 812, a one hop field 814, a hop request field (hop req) 816, a forward packet field (fwd pck) 818, a network update (netw. update) 820, and a frame control extension (FC extension) 822.

The frame control format 800 is used by a wireless battery management system to indicate what type of frame is transmitted between the primary network node and the secondary network nodes to communicate battery management information. For example, the frame control format 800 may be used by the primary network node to instruct the secondary network nodes to pair with the primary network node for battery management purposes. In another example, the frame control format 800 may be used as frame control of a DL protocol format as discussed with reference to FIG. 6 in a DL frame as discussed with reference to FIG. 3.

In an example, the length field bit 802 is used in combination with a length field (e.g., the length field 706) to indicate the length of a data frame. Here, the data frame is the entire frame of the UL/DL protocol format (e.g., the DL protocol format 600 or the UL protocol format 700). In an example, the length field bit 802 may indicate the maximum packet length of a data frame supported by the primary network node and the secondary network nodes is 512 bytes. The frame type 804 is used to indicate the type of a current frame according to Table 1.

TABLE 1

Frame Type and Frame Subtype field encoding

| Frame Type value b4b3b2b1 | Frame Type name |
|---|---|
| 0000 | Scan Request |
| 0001 | Scan Response |
| 0010 | Pairing Request |
| 0011 | Pairing Response |
| 0100 | IAmAlive |
| 0101 | Fault frame |
| 0110 | Aggregated frame DL |
| 0111 | Aggregated frame UL |
| 1000 | Data DL |
| 1001 | Data UL |
| 1010-1111 | Reserved |

The scan request, scan response, pairing request, and pairing response are discussed in further detail with respect to FIG. 4A and FIG. 4B. The IAmAlive frame type is a frame transmitted by the secondary network nodes to maintain synchronous communication with the primary network node. For example, a secondary network node asserts the IAmAlive frame type to the primary network node to communicate that the secondary network node is still in connection with the primary network node. The fault frame indicates whether the frame type is an erroneous frame, which provides use in debugging communication errors. For example, a secondary network node asserts the fault frame when hardware from the secondary network node fails. The aggregated frame DL type and aggregated frame UL type indicate that data will be either received or transmitted, respectively. For example, a UL is aggregated when a secondary network node reads several frames of health information about the battery cells, collects the health information in aggregate, and transmits the aggregated health information to the primary network node using the aggregated UL type. The data DL frame type and data UL frame type indicate that data will be either received or transmitted, respectively, without aggregation. For example, a secondary network node determines health information about battery cells, collects the health information, and transmits the health information to the primary network node using the data UL frame type. Reserved indicates reserve bits which are set to zero on transmission and ignored on reception.

The security enable 806 is used to indicate whether a security header (e.g., the security header 718) is included and what type of security is used by the primary network node and the secondary network nodes. The security type includes three levels. Level 0 indicates unsecured communication between the primary network nodes and the secondary network nodes. Level 1 indicates authentication and no encryption between the primary network nodes and the secondary network nodes. Level 2 indicates authentication and encryption between the primary network nodes and the secondary network nodes. Here, authentication means that messages are transmitted between the primary network nodes and the secondary network nodes with an authentication tag, which provides message authenticity and integrity validation. The type of security is based on the bit mapping in Table 2.

TABLE 2

Security Mode

| Field value b6b5 | Highest security level supported |
| --- | --- |
| 00 | Level 0 - unsecured communication |
| 01 | Level 1 - authentication but not encryption |
| 10 | Level 2 - authentication and encryption |
| 11 | Reserved |

The fragment number 808 indicates when a data frame is fragmented. The data frame is fragmented when the data frame is one of a plurality of data frames to be sent by the primary network node or the secondary network nodes. The fragment number 808 is set to 0 by default. The fragment number 808 is set to 0 when the data frame is not fragmented or the data frame is the first of the plurality of data frames. The fragment number 808 is incremented by one when the data frame is part of the plurality but not the first data frame.

The PS 810 indicates whether the PS operation is ON or OFF. When the primary network node and the secondary network nodes are in the PS operation, the primary network node and the secondary network nodes are in a power conservation mode to reserve power, keep the communication synchronized, and transmit battery measurement data. The primary network node and the secondary network nodes transmit battery measurement data at a rate below a threshold when the PS operation is ON. The primary network node and the secondary network nodes are in normal operation when the PS 810 has a bit value of 0 (indicating PS operation is OFF). Normal operation means the primary network node and the secondary network nodes exchange data frames every SF. The primary network node and the secondary network nodes are in the PS mode 812 when the PS 810 has a bit value of 1 (indicating PS operation is ON). In an example, the PS 810 has a bit value of 0 (indicating PS operation is OFF) when a vehicle that includes a wireless battery management system is powered up or when the battery cells are being charged.

The PS mode 812 indicates whether the primary network node and the secondary network nodes are using a keep alive PS (the PS mode 812 is a bit value of 1) or a master shut down PS (the PS mode 812 is a bit value of 0). During the keep alive PS mode, the primary network node and the secondary network nodes enter a power conservation mode, exchange data frames to keep the communication between the primary network node and the secondary network nodes synchronized, and transmit battery measurement data. During the master shut down PS, the primary network node is in another power conservation mode, enters a standby mode, and sends null data frames after the primary network node receives instruction to power ON with the PS 810 bit value of 1. The standby mode is when the primary network node waits to receive instruction to power ON.

The one hop field 814 indicates whether one hop extension is supported by the primary network node or the secondary network nodes. The one hop extension is when one of the secondary network nodes communicates with the primary network node on behalf of another secondary network node. For example, if a first secondary network node loses connection to a primary network node, then the first secondary network node can communicate with a second secondary network node as an intermediate node to communicate with the primary network node. The hop request field 816 indicates whether one of the secondary network nodes is performing one hop extension and requesting to be used as an intermediate node for communicating with the primary network node. The forward packet field 818 indicates whether the data frame is being forwarded from one of the secondary network nodes, on behalf of another secondary network node performing one hop extension, to the primary network node.

The network update 820 indicates whether the primary network node and the secondary network nodes will be updated to include an additional hop. The additional hop may include a change in frequency or a change in channel between the primary network node and the secondary network nodes. In an example, the additional hop may indicate a number of slots for a scan period of frequency hopping. Both the change in frequency and the channel change are subject to the frequency hopping as described in the foregoing discussion.

The frame control extension 822 indicates whether the frame control format 800 will be extended. For example, a length of the frame control format 800 may increase based on whether a bit value of the frame control extension 822 is 0 or 1. The frame control format 800 will not be extended when the frame control extension 822 has the bit value of 0. The frame control format 800 will be extended when the frame control extension 822 has the bit value of 1. In an example, the frame control extension 822 indicates a frame control format 800 extension of 1 byte when the frame control extension 822 has the bit value of 1.

Figure 9:
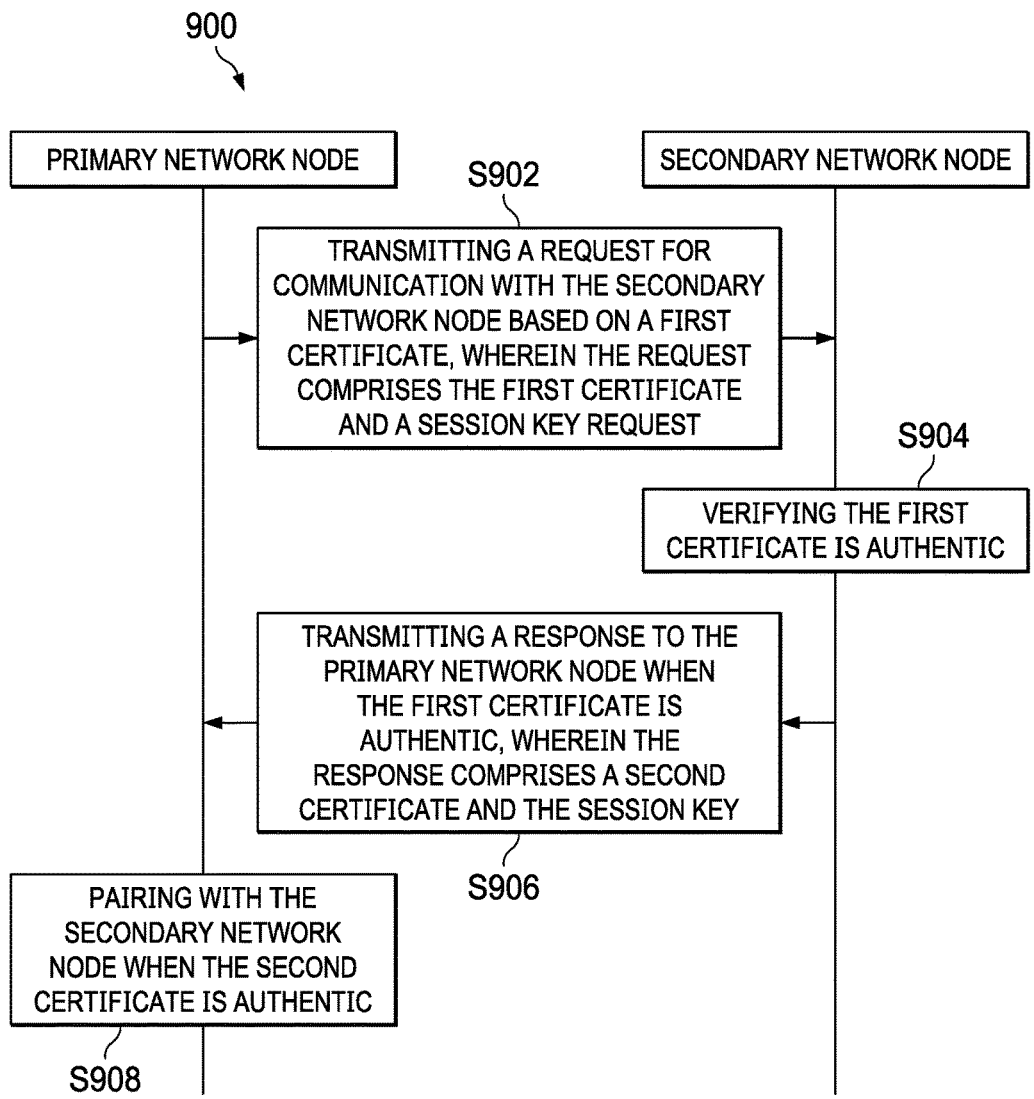
FIG. 9 is a security data flow diagram according to an example of this disclosure.

FIG. 9 illustrates an example security data flow diagram 900 of a technique for security key authentication used by a wireless battery management system, e.g., the wireless battery management system 100. In an example, a primary network node applies steps of the security data flow diagram 900 when scanning a network for secondary network nodes, as discussed with reference to FIG. 4A.

The security data flow diagram 900 includes transmitting, by the primary network node, a request for communication with a secondary network node based on a first certificate, where the request includes the first certificate and a session key request (902). The session key request includes information about a session between the primary network node and the secondary network node. The session is a temporary and interactive information interchange between the primary network node and the secondary network node. In an example, the session indicates a time span in which a public (or a private) key remains valid between the primary network node and the secondary network node. In an example, each secondary network node includes a unique public (or private) key. The primary network node determines a duration of the time span. In an example, the primary network node updates a first session identifier when the primary network node updates the public (or private) key. The first session identifier acts as a counter to track an occurrence of key updates. The primary network node and the secondary network node use the public (or private) key to secure messages between the nodes. For example, the secondary network node uses a private key to decrypt a message from the primary network node. In an example, the primary network node generates the first certificate as follows:

$$\text{Cert}_P = \text{Sign}(U_{ID,P} \| Pub\_ID) K_{pri,CA},$$

where the Sign( ) function indicates the sign of an argument within the parentheses (either a value of 1 if the argument is positive or a value of 0 if the argument is negative), $U_{ID,P}$ is a first operand of the argument and is the unique identifier of the primary network node, $\|$ represents a logical "OR" operation between two operands, Pub_ID is a second operand of the argument and is the public identifier of the primary network node, and $K_{pri,CA}$ is a first private key of a certificate authority (CA). In an example, the CA may be a third party entity that issues private keys. The first private key is a first file from the CA that the primary network node uses to encrypt the result of the Sign( ) function to obtain the first certificate. The encrypted result of the Sign( ) function may be decrypted by the secondary network node using a first public key. In another example, the CA generates the first certificate.

The security data flow diagram 900 includes verifying, by the secondary network node, the first certificate is authentic (904). In an example, the first certificate is authentic when the secondary network node is successful in applying a verification function to the first certificate after decrypting the first certificate using the first public key.

The security data flow diagram 900 includes transmitting, by the secondary network node, a response to the primary network node when the first certificate is authentic, where the response includes a second certificate and a session key (906). The session key includes a second session identifier. In an example, the secondary network node updates the second session identifier when the secondary network node updates the public (or private) key. The second session identifier acts as a counter to track an occurrence of key updates.

In an example, the secondary network node generates the second certificate as follows:

$$\text{Cert}_S = \text{Sign}(U_{ID,S} \| Pub\_ID) K_{pri,CA},$$

where the Sign( ) function indicates the sign of the argument within the parentheses (either a value of 1 if the argument is positive or a value of 0 if the argument is negative), $U_{ID,S}$ is a first operand of the argument and is the unique identifier of the secondary network node, $\|$ represents a logical "OR" operation between two operands, Pub_ID is a second operand of the argument and is the public identifier of the secondary network node, and $K_{pri,CA}$ is a second private key of the CA. The second private key is a second file from the CA that the secondary network node uses to encrypt the result of the Sign( ) function for the second certificate. In an example, the encrypted result of the Sign( ) function may be decrypted by the primary network node using a second public key. In another example, the CA generates the second certificate.

The security data flow diagram 900 includes pairing, by the primary network node, with the secondary network node when the second certificate is authentic (908). In an example, the second certificate is authentic when the primary network node is successful in applying a verification function after decrypting the second certificate using the second public key. In an example, the pairing between the primary network node and the secondary network node is completed as discussed with reference to FIG. 4B.

Figure 10:
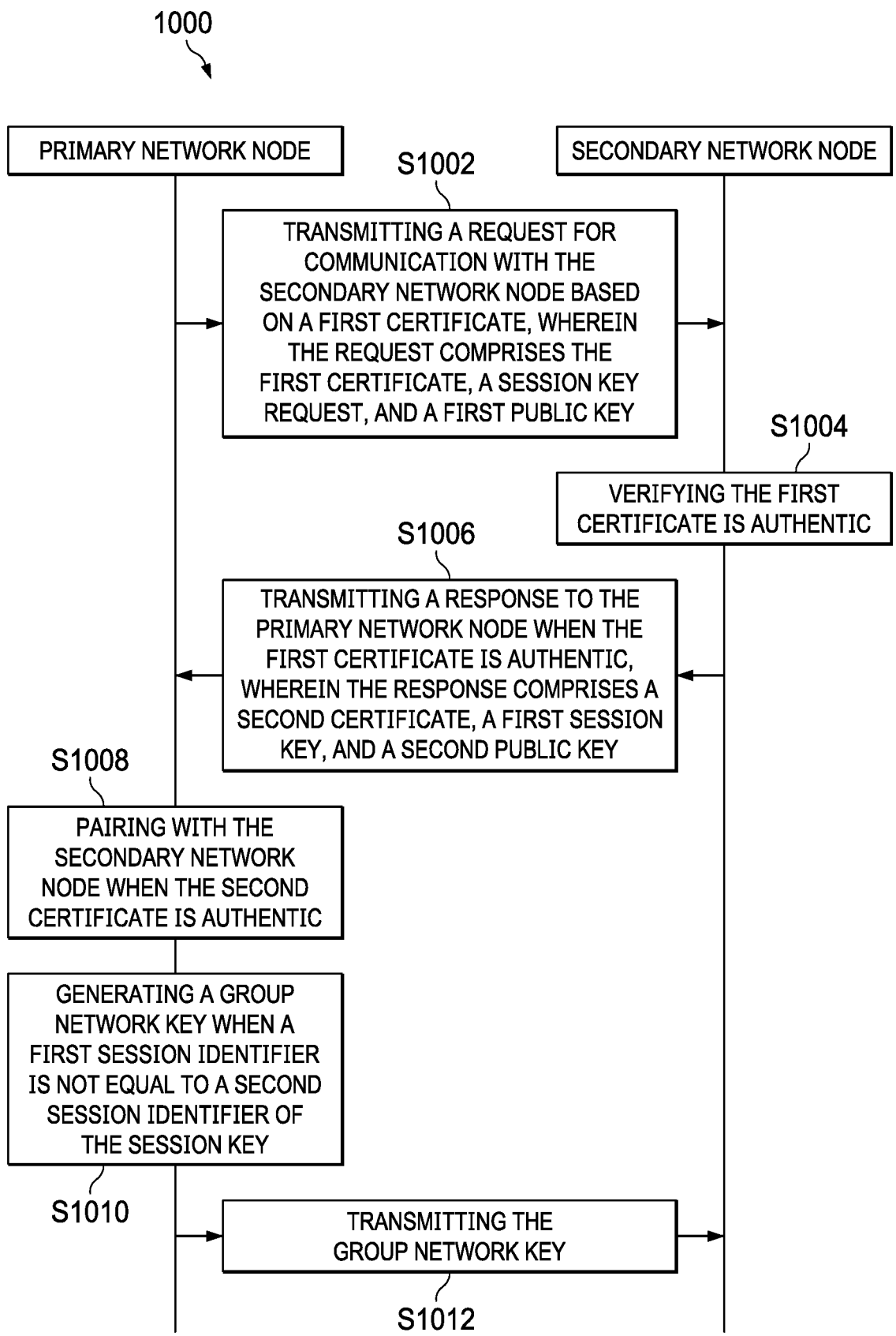
FIG. 10 is a security data flow diagram according to an example of this disclosure.

FIG. 10 illustrates an example security data flow diagram 1000 of a technique for exchanging security keys used by a wireless battery management system, e.g., the wireless battery management system 100. In an example, a primary network node provides a private key and a public key to a secondary network node using steps of the security data flow diagram 1000. The primary network node provides the private key and the public key to a secondary network node when a first session identifier of the primary network node is different from a second session identifier of the secondary network node. The session is a temporary and interactive information interchange between the primary network node and the secondary network node. In an example, the session indicates a time span in which the public (or the private) key remains valid between the primary network node and the secondary network node. The primary network node determines a duration of the time span. The primary network node updates a first session identifier when the primary network node updates the public (or private) key. The first session identifier acts as a counter to track an occurrence of key updates. The secondary network node updates the second session identifier when the secondary network node updates the public (or private) key. The second session identifier acts as a counter to track an occurrence of key updates. In an example, the primary network node follows the security data flow diagram 1000 when scanning a network for the secondary network nodes as discussed with reference to FIG. 4A and pairing with the secondary network nodes as discussed with reference to FIG. 4B.

The security data flow diagram 1000 includes transmitting, by the primary network node, a request for communication with the secondary network node based on a first certificate, where the request includes the first certificate, a session key request, and a first public key (1002). The session key request includes information about the session between the primary network node and the secondary network node. The primary network node and the secondary network node use the public (or private) key to secure messages between the nodes. For example, the secondary network node uses the first public key to decrypt a message from the primary network node.

In an example, the primary network node generates the first certificate as follows:

$$Cert_P = Sign(U_{ID,P} \| Pub\_ID) K_{pri,CA},$$

where the Sign( ) function indicates the sign of the argument within the parentheses (either a value of 1 if the argument is positive or a value of 0 if the argument is negative), $U_{ID,P}$ is a first operand of the argument and is the unique identifier of the primary network node, ‖ represents a logical "OR" operation between two operands, Pub_ID is a second operand of the argument and is the public identifier of the primary network node, and $K_{pri,CA}$ is a first private key of a CA. In an example, the CA may be the primary network node, or some other third party entity that issues private keys. The first private key is a first file from the CA that the primary network node uses to encrypt the result of the Sign( ) function for the first certificate.

The security data flow diagram 1000 includes verifying, by the secondary network node, the first certificate is authentic (1004). In an example, the first certificate is authentic when the secondary network node is successful in applying a verification function to the first certificate after decrypting the first certificate using the first public key.

The security data flow diagram 1000 includes transmitting, by the secondary network node, a response to the primary network node when the first certificate is authentic, where the response includes a second certificate, a first session key, and a second public key (1006). In an example, the session key includes information about a second session identifier.

In an example, the secondary network node generates the second certificate as follows:

$$Cert_S = Sign(U_{ID,S} \| Pub\_ID) K_{pri,CA},$$

where the Sign( ) function indicates the sign of the argument within the parentheses (either a value of 1 if the argument is positive or a value of 0 if the argument is negative), $U_{ID,S}$ is a first operand of the argument and is the unique identifier of the secondary network node, ‖ represents a logical "OR" operation between two operands, Pub_ID is a second operand of the argument and is the public identifier of the secondary network node, and $K_{pri,CA}$ is a second private key of the CA. The second private key is a second file from the CA that the secondary network node uses to encrypt the result of the Sign( ) function for the second certificate. In an example, the primary network node may decrypt the encrypted result of the Sign( ) function using the second public key.

The security data flow diagram 1000 includes pairing, by the primary network node, with the secondary network node when the second certificate is authentic (1008). In an example, the second certificate is authentic when the primary network node is successful in applying a verification function to the second certificate after decrypting the second certificate using the second public key. In an example, the pairing between the primary network node and the secondary network node functions is discussed with reference to FIG. 4B.

The security data flow diagram 1000 includes generating, by the primary network node, a group network key when the first session identifier is not equal to a second session identifier of the second session key (1010). Optionally, in an example, the primary network node encrypts the group network key. In an example, the group network key may be used by the primary network node to communicate with a plurality of secondary network nodes. The security data flow diagram 1000 includes transmitting, by the primary network node, the group network key to the secondary network node (1012).

Figure 11:
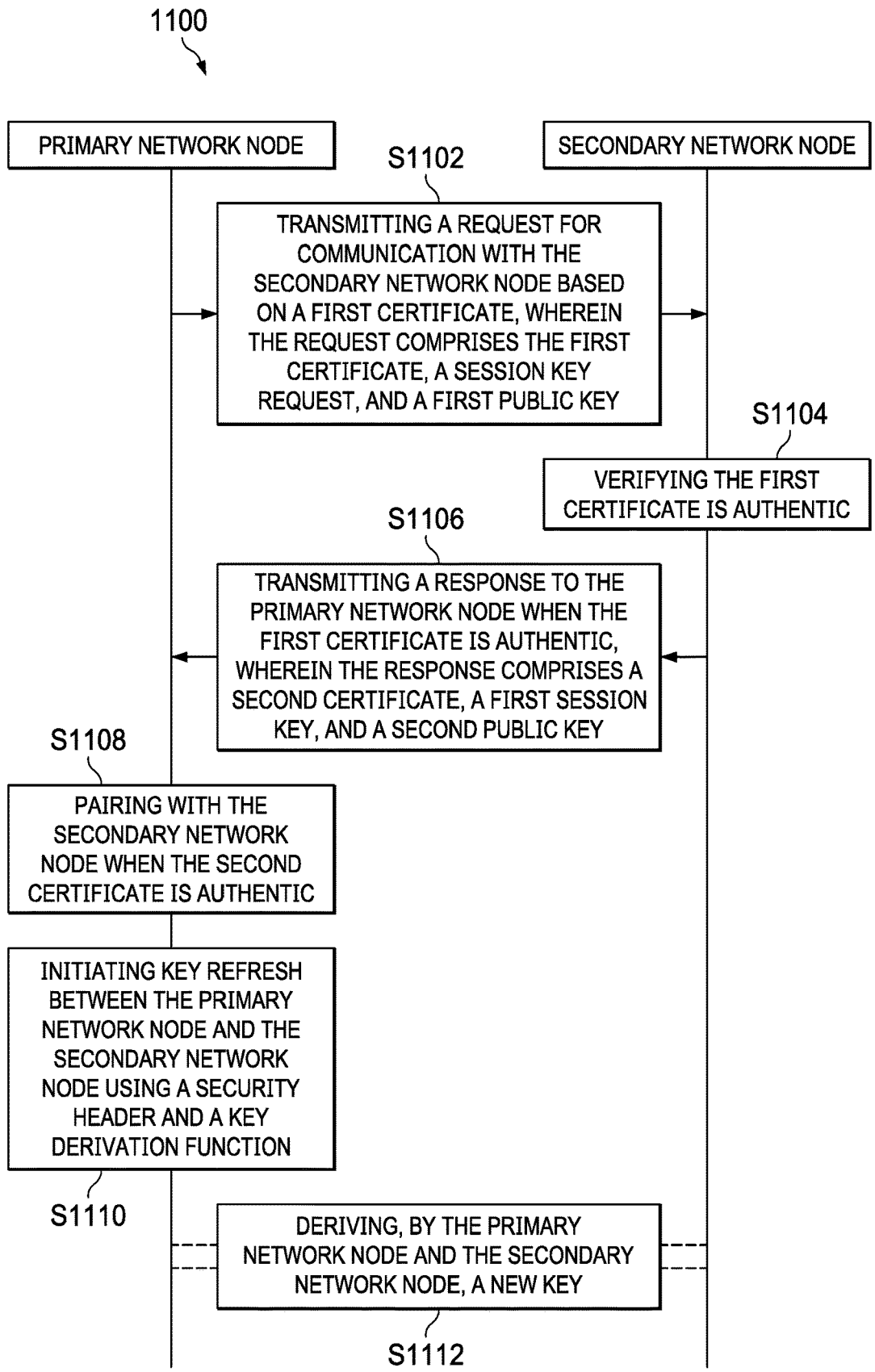
FIG. 11 is a security data flow diagram according to an example of this disclosure.

FIG. 11 illustrates an example security data flow diagram 1100 of a technique for refreshing security keys used by a wireless battery management system, e.g., the wireless battery management system 100. In an example, a primary network node updates a private (or public) key using steps of the security data flow diagram 1100. The primary network node updates the private (or public) key when a condition is met. In an example, the condition to update the private (or public) key may be based on the expiration of a time duration that tracks how long the primary network node and the secondary network node use an initial key. The primary network node and the secondary network node each derive a new key based on information from the initial key. The primary network node follows the security data flow diagram 1100 when scanning a network for the secondary network nodes as discussed with reference to FIG. 4A and pairing with the secondary network nodes as discussed with reference to FIG. 4B.

The security data flow diagram 1100 includes transmitting, by the primary network node to the secondary network node, a request for communication with the secondary network node based on a first certificate, where the request includes the first certificate, a session key request, and a first public key (1102). The session key request includes information about a session between the primary network node and the secondary network node. The session is a temporary and interactive information interchange between the primary network node and the secondary network node. In an example, the session indicates a time span in which the private (or the public) key remains valid between the primary network node and the secondary network node. The primary network node determines a duration of the time span. The primary network node updates a first session identifier when the primary network node updates the public (or private) key. The first session identifier acts as a counter to track an occurrence of key updates. The primary network node and the secondary network node use the private (or the public) key to secure messages between the nodes. For example, the secondary network node uses a private key to decrypt a message from the primary network node.

In an example, the primary network node generates the first certificate as follows:

$$Cert_P = Sign(U_{ID,P} \| Pub\_ID) K_{pri,CA},$$

where the Sign( ) function indicates the sign of the argument within the parentheses (either a value of 1 if the argument is positive or a value of 0 if the argument is negative), $U_{ID,P}$ is a first operand of the argument and is the unique identifier of the primary network node, ‖ represents a logical "OR" operation between two operands, Pub_ID is a second operand of the argument and is the public identifier of the primary network node, and $K_{pri,CA}$ is a first private key of a CA. In an example, the CA may be the primary network node, or some other third party entity that issues private keys. The first private key is a first file from the CA that the primary network node uses to encrypt the result of the Sign( ) function for the first certificate. The secondary network node may decrypt the encrypted result of the Sign( ) function using a first public key.

The security data flow diagram 1100 includes verifying, by the secondary network node, the first certificate is authentic (1104). In an example, the first certificate is authentic when the secondary network node is successful in applying a verification function to the first certificate after decrypting the first certificate using the first public key.

The security data flow diagram 1100 includes transmitting, by the secondary network node, a response to the primary network node when the first certificate is authentic, where the response includes a second certificate, a first session key, and a second public key (1106). The session key includes a second session identifier. The secondary network node updates the second session identifier when the secondary network node updates the public (or private) key. The second session identifier acts as a counter to track an occurrence of key updates. In an example, the secondary network node generates the second certificate as follows:

$$Cert_S = Sign(U_{ID,S} \| Pub\_ID) K_{pri,CA},$$

where the Sign( ) function indicates the sign of the argument within the parentheses (either a value of 1 if the argument is positive or a value of 0 if the argument is negative), $U_{ID,S}$ is a first operand of the argument and is the unique identifier of the secondary network node, $\|$ represents a logical "OR" operation between two operands, Pub_ID is a second operand of the argument and is the public identifier of the secondary network node, and $K_{pri,CA}$ is a second private key of the CA. The second private key is a second file from the CA that the secondary network node uses to encrypt the result of the Sign( ) function for the second certificate. In an example, the primary network node may decrypt the encrypted result of the Sign( ) function using a second public key.

The security data flow diagram 1100 includes pairing, by the primary network node, with the secondary network node when the second certificate is authentic (1108). In an example, the second certificate is authentic when the primary network node is successful in applying a verification function to the second certificate after decrypting the second certificate using the second public key. In an example, the pairing between the primary network node and the secondary network node functions is completed as discussed with reference to FIG. 4B.

The security data flow diagram 1100 includes initiating key refresh, by the primary network node, between the primary network node and the secondary network node using a security header and a key derivation function (1110). The key refreshment is a process for updating the private (or public) key. In an example, the key refresh is used to indicate, and complete, updating of the security keys that are exchanged between the primary network node and the secondary network nodes. In an example, the security header may be as discussed with reference to FIG. 6. In an example, the key derivation function is a function used to derive one or more keys from an existing key.

The security data flow diagram 1100 includes deriving, by the primary network node and the secondary network node, a new key (1112). The primary network node and the secondary network node derive the new key independently based on the key derivation function. In an example, the primary network node and the secondary network node may each be able to derive the new key without transmitting any information about the new key to the other node.

Figure 12:
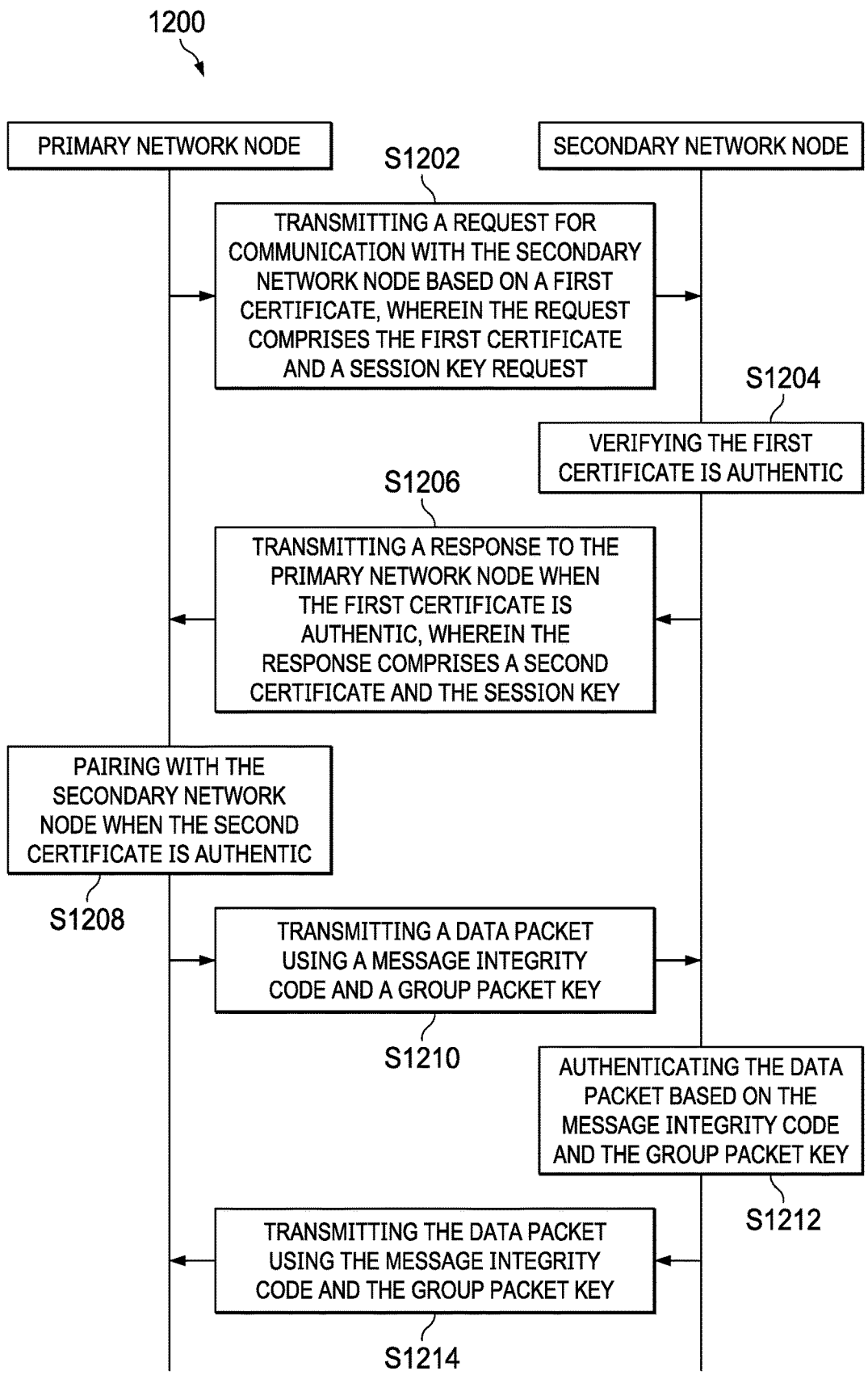
FIG. 12 is a security data flow diagram according to an example of this disclosure.

FIG. 12 illustrates an example security data flow diagram 1200 of a technique for determining and entering a security state used by a wireless battery management system, e.g., the wireless battery management system 100. In an example, steps of the security data flow diagram 1200 apply when a primary network node and a secondary network node are in security Level 1 or Level 2 as discussed with reference to FIG. 8. The steps in the security data flow diagram 1200 are described based on the wireless battery management system being in a security Level 1. Optionally, there are steps not shown in the security data flow diagram 1200 that are described in this disclosure based on the wireless battery management system being in a security Level 2.

The security data flow diagram 1200 includes transmitting, by the primary network node, a request for communication to the secondary network node based on a first certificate, where the request includes the first certificate and a session key request (1202). The session key request includes information about a session between the primary network node and the secondary network node. The session is a temporary and interactive information interchange between the primary network node and the secondary network node. In an example, the session indicates a time span in which a public (or a private) key remains valid between the primary network node and the secondary network node. The primary network node determines a duration of the time span. The primary network node updates a first session identifier when the primary network node updates the public (or private) key. The first session identifier acts as a counter to track an occurrence of key updates. The primary network node and the secondary network node use the public (or private) key to secure messages. For example, the secondary network node uses a private key to decrypt a message from the primary network node.

In an example, the primary network node generates the first certificate as follows:

$$Cert_P = Sign(U_{ID,P} \| Pub\_ID) K_{pri,CA},$$

where the Sign( ) function indicates the sign of the argument within the parentheses (either a value of 1 if the argument is positive or a value of 0 if the argument is negative), $U_{ID,P}$ is a first operand of the argument and is the unique identifier of the primary network node, $\|$ represents a logical "OR" operation between two operands, Pub_ID is a second operand of the argument and is the public identifier of the primary network node, and $K_{pri,CA}$ is a first private key of a CA. In an example, the CA may be the primary network node, or some other third party entity that issues private keys. The first private key is a first file from the CA that the primary network node uses to encrypt the result of the Sign( ) function for the first certificate. The secondary network node may decrypt the encrypted result of the Sign( ) function using a first public key.

The security data flow diagram 1200 includes verifying, by the secondary network node, the first certificate is authentic (1204). In an example, the first certificate is authentic when the secondary network node is successful in applying a verification function to the first certificate after decrypting the first certificate with the first public key.

The security data flow diagram 1200 includes transmitting, by the secondary network node, a response to the primary network node when the first certificate is authentic, where the response includes a second certificate and the session key (1206). The session key includes a second session identifier. The secondary network node updates the second session identifier when the secondary network node updates the public (or private) key. The second session identifier acts as a counter to track an occurrence of key updates. In an example, the secondary network node generates the second certificate as follows:

$$Cert_S = Sign(U_{ID,S} \| Pub\_ID) K_{pri,CA},$$

where the Sign( ) function indicates the sign of the argument within the parentheses (either a value of 1 if the argument is positive or a value of 0 if the argument is negative), $U_{ID,S}$ is a first operand of the argument and is the unique identifier of the secondary network node, || represents a logical "OR" operation between two operands, Pub_ID is a second operand of the argument and is the public identifier of the secondary network node, and $K_{pri,CA}$ is a second private key of the CA. The second private key is a second file from the CA that the secondary network node uses to encrypt the result of the Sign( ) function for the second certificate. In an example, the primary network node may decrypt the encrypted result of the Sign( ) function using a second public key.

The security data flow diagram 1200 includes pairing, by the primary network node, with the secondary network node when the second certificate is authentic (1208). In an example, the second certificate is authentic when the primary network node is successful in applying a verification function to the second certificate after decrypting the second certificate using the second public key. In an example, the pairing between the primary network node and the secondary network node is as discussed with reference to FIG. 4B.

The security data flow diagram 1200 includes transmitting, by the primary network node when the primary network node and the secondary network node are in the security Level 1, a data packet using a MIC and a group packet key (1210). Optionally, when the primary network node and the secondary network node are in the security Level 2, the primary network node encrypts the data packet and transmits the data packet using an encryption and authentication code. In an example, the MIC may be as discussed with reference to FIG. 6.

The security data flow diagram 1200 includes authenticating, by the secondary network node when the primary network node and the secondary network node are in the security Level 1, the data packet based on the MIC and the group packet key (1212). In an example, the data packet is authentic when the secondary network node is successful in verifying integrity and authenticity of a header of the data packet from the MIC. The integrity of the header is based on whether there exist changes in the content of the header. Optionally, when the primary network node and the secondary network node are in the security Level 2, the secondary network node authenticates the data packet based on the encryption and authentication code. In an example, the data packet is authentic when the secondary network node is successful in decrypting the data packet based on the encryption and authentication code. The security data flow diagram 1200 includes transmitting, by the secondary network node when the primary network node and the secondary network node are in the security Level 1, the data packet using the MIC and the group packet key (1214). Optionally, when the primary network node and the secondary network node are in the security Level 2, the secondary network node encrypts the data packet and transmits the data packet based on the encryption and authentication code.

Figure 13:
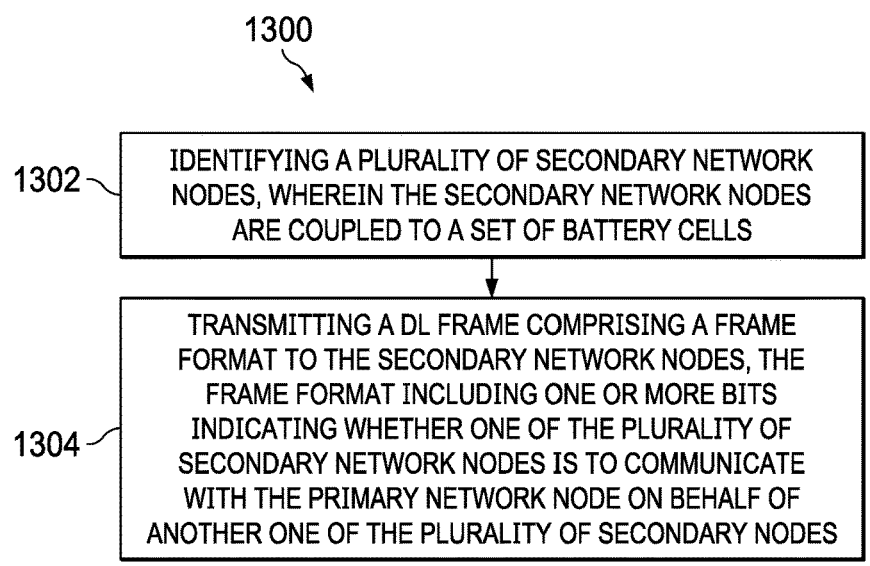
FIG. 13 is a flow diagram of a method for a wireless battery management system according to an example of this disclosure.

FIG. 13 is a flow chart of an example method 1300 for a wireless battery management system, e.g., the wireless battery management system 100. The method 1300 is used by a wireless battery management system to establish communication between a primary network node and secondary network nodes. The method 1300 includes identifying the secondary network nodes, where the secondary network nodes coupled to a set of battery cells (1302). The method 1300 includes transmitting a DL frame comprising a frame format to the secondary network nodes, the frame format including one or more bits indicating whether one of the plurality of secondary network nodes is to communicate with the primary network node on behalf of another one of the plurality of secondary nodes (1304).

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

The invention claimed is:

1. A system comprising:
a first secondary network node;
a second secondary network node; and
a primary network node configured to send a message to the first secondary network node to communicate with the second secondary network node,
wherein the message includes a first field indicating that one hop extension is supported,
wherein the message includes a second field indicating a device that received the message is performing the one hop extension, and
wherein the first secondary network node is configured to, in response to the message:
communicate with the second secondary network node on behalf of the primary network node; and
communicate with the primary network node on behalf of the second secondary network node.

2. The system of claim 1, wherein the first secondary network node is configured to communicate with the second secondary network node as an intermediate node in response to the message.

3. The system of claim 1,
wherein the message is a first message,
wherein the first secondary network node is configured to communicate with the primary network node by sending a second message to the primary network node, and
wherein the second message includes a data frame and a field indicating that the data frame is being forwarded from the second secondary network node to the primary network node.

4. The system of claim 3, wherein the first secondary network node is configured to send the second message to the primary network node after receiving the data frame from the second secondary network node.

5. The system of claim 1, wherein the message includes a field indicating that the primary network node is in a power conservation mode.

6. The system of claim 1, wherein the message includes a field indicating a type of security usable by the primary network node.

7. The system of claim 6,
wherein a first status of the field indicates unsecure communication,
wherein a second status of the field indicates authentication of communication, and
wherein a third status of the field indicates the authentication of communication and encryption.

8. A device comprising:
a wireless transceiver configured to receive a message from a primary network node, wherein the message includes a first field indicating that one hop extension is supported, and wherein the message includes a second field indicating a device that received the message is performing the one hop extension; and
a processing circuit configured to, in response to the message:
cause the wireless transceiver to communicate with a secondary network node on behalf of the primary network node; and
cause the wireless transceiver to communicate with the primary network node on behalf of the secondary network node.

9. The device of claim 8, wherein the processing circuit is configured to cause the wireless transceiver to communicate with the secondary network node as an intermediate node in response to the message.

10. The device of claim 8,
wherein the message is a first message,
wherein the processing circuit is configured to cause the wireless transceiver is configured to communicate with the primary network node by sending a second message to the primary network node, and
wherein the second message includes a data frame and a field indicating that the data frame is being forwarded from the secondary network node to the primary network node.

11. The device of claim 10, wherein the processing circuit is configured to cause the wireless transceiver to send the second message to the primary network node after receiving the data frame from the secondary network node.

12. The device of claim 8, wherein the message includes a field indicating that the primary network node is in a power conservation mode.

13. The device of claim 8, wherein the message includes a field indicating a type of security usable by the primary network node.

14. The device of claim 13,
wherein a first status of the field indicates unsecure communication,
wherein a second status of the field indicates authentication of communication, and
wherein a third status of the field indicates the authentication of communication and encryption.

15. A method comprising:
receiving a message from a primary network node, wherein the message includes a first field indicating that one hop extension is supported, and wherein the message includes a second field indicating a device that received the message is performing the one hop extension;
communicating with a secondary network node on behalf of the primary network node in response to the message; and
communicating with the primary network node on behalf of the secondary network node in response to the message.

16. The method of claim 15,
wherein the message is a first message,
wherein communicating with the primary network node comprises sending a second message to the primary network node, and
wherein the second message includes a data frame and a field indicating that the data frame is being forwarded from the secondary network node to the primary network node.

17. The method of claim 16, wherein sending the second message to the primary network node occurs after receiving the data frame from the secondary network node.

18. The method of claim 15, wherein the message includes a field indicating that the primary network node is in a power conservation mode.

19. The method of claim 15, wherein the message includes a field indicating a type of security usable by the primary network node.

20. The method of claim 19,
wherein a first status of the field indicates unsecure communication,
wherein a second status of the field indicates authentication of communication, and
wherein a third status of the field indicates the authentication of communication and encryption.

* * * * *